United States Patent
Tang et al.

(10) Patent No.: US 12,244,911 B2
(45) Date of Patent: Mar. 4, 2025

(54) IMAGE OBTAINING METHOD AND APPARATUS, TERMINAL, AND COMPUTER-READABLE STORAGE MEDIUM HAVING MULTIPLE PANCHROMATIC BINNNG MODES

(71) Applicant: GUANGDONG OPPO MOBILE TELECOMMUNICATIONS CORP., LTD., Guangdong (CN)

(72) Inventors: Cheng Tang, Guangdong (CN); Longjia Li, Guangdong (CN); Gong Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 86 days.

(21) Appl. No.: 18/193,134

(22) Filed: Mar. 30, 2023

(65) Prior Publication Data

US 2023/0254553 A1  Aug. 10, 2023

Related U.S. Application Data

(63) Continuation of application No. PCT/CN2021/105464, filed on Jul. 9, 2021.

(30) Foreign Application Priority Data

Oct. 9, 2020 (CN) .......................... 202011073863.3
Oct. 9, 2020 (CN) .......................... 202022245405.5

(51) Int. Cl.
*H04N 5/335* (2011.01)
*H04N 23/12* (2023.01)
(Continued)

(52) U.S. Cl.
CPC ............. *H04N 23/12* (2023.01); *H04N 23/55* (2023.01); *H04N 23/71* (2023.01); *H04N 25/11* (2023.01); *H04N 25/46* (2023.01)

(58) Field of Classification Search
CPC ....................................................... H04N 25/46
See application file for complete search history.

(56) References Cited

U.S. PATENT DOCUMENTS 9,584,742 B2 * 2/2017 Park ...................... H04N 25/46
9,699,429 B2    7/2017 Kaizu
(Continued)

FOREIGN PATENT DOCUMENTS

CN    101233762    7/2008
CN    101753863    6/2010
(Continued)

OTHER PUBLICATIONS

EPO, Extended European Search Report for EP Application No. 21876886.9, Dec. 21, 2023.
(Continued)

*Primary Examiner* — Gary C Vieaux
(74) *Attorney, Agent, or Firm* — Hodgson Russ LLP

(57) ABSTRACT

An image obtaining method includes outputting an image in at least one of multiple image output modes. The multiple image output modes include a full-size mode, a first binning mode, and a second binning mode. In the full-size mode, a first image is obtained according to a first pixel value. In the first binning mode, a second image is obtained according to a second pixel value and a third pixel value. In the second binning mode, a third image is obtained according to a fourth pixel value and a fifth pixel value.

20 Claims, 12 Drawing Sheets

(51) Int. Cl.
*H04N 23/55* (2023.01)
*H04N 23/71* (2023.01)
*H04N 25/11* (2023.01)
*H04N 25/46* (2023.01)

(56) References Cited

U.S. PATENT DOCUMENTS

| | | |
|---|---|---|
| 2007/0024931 A1 | 2/2007 | Compton et al. |
| 2011/0096179 A1 | 4/2011 | Border et al. |
| 2016/0150199 A1 | 5/2016 | Wu et al. |
| 2018/0122046 A1 | 5/2018 | Singh et al. |
| 2021/0021790 A1* | 1/2021 | Singh .................. H04N 23/84 |

FOREIGN PATENT DOCUMENTS

| | | |
|---|---|---|
| CN | 102369721 | 3/2012 |
| CN | 102396235 | 3/2012 |
| CN | 102461175 | 5/2012 |
| CN | 104280803 | 1/2015 |
| CN | 108965666 | 12/2018 |
| CN | 110876027 | 3/2020 |
| CN | 111586323 | 8/2020 |
| CN | 111711755 | 9/2020 |

OTHER PUBLICATIONS

CNIPA, Notification to Grant Patent Right For Invention for CN Application No. 202011073863.3, May 31, 2024.
WIPO, International Search Report and Written Opinion for International Application No. PCT/CN2021/105464, Sep. 28, 2021.
EPO, Communication for EP Application No. 21876886.9, Oct. 17, 2024.

* cited by examiner

IMAGE OBTAINING METHOD AND APPARATUS, TERMINAL, AND COMPUTER-READABLE STORAGE MEDIUM HAVING MULTIPLE PANCHROMATIC BINNNG MODES

CROSS-REFERENCE TO RELATED APPLICATION(S)

This application is a continuation of International Application No. PCT/CN2021/105464, filed Jul. 9, 2021, which claims priority to Chinese Patent Application No. 202011073863.3, filed Oct. 9, 2020, and Chinese Patent Application No. 202022245405.5, filed Oct. 9, 2020. The entire disclosures of the aforementioned applications are incorporated herein by reference.

TECHNICAL FIELD

This disclosure relates to the field of image processing technology, and in particular to an image obtaining method and apparatus, a terminal, and a non-transitory computer-readable storage medium.

BACKGROUND

At present, during shooting of a camera, an image output mode is generally fixed, leading to poor adaptability to different scenes. In order to improve imaging quality in different scenes, only some compensation can be made by adjusting an exposure parameter.

SUMMARY

In a first aspect, an image obtaining method in implementations of the disclosure is applied to an image sensor. The image sensor includes a filter array and a pixel array. The filter array includes minimal repeating units. Each minimal repeating unit includes multiple filter groups. Each filter group includes a color filter and a panchromatic filter. A waveband of light passing through the color filter is narrower than a waveband of light passing through the panchromatic filter. The color filter and the panchromatic filter each include multiple sub-filters. The pixel array includes multiple pixels. Each pixel corresponds to one sub-filter in the filter array and is configured to receive light passing through the sub-filter to generate an electrical signal. The image obtaining method includes outputting an image in at least one of multiple image output modes, where the multiple image output modes includes: a full-size mode in which a first image is obtained according a first pixel value read from each pixel; a first binning mode in which a second image is obtained according to a second pixel value and a third pixel value, where the second pixel value is read from binning of multiple pixels corresponding to the panchromatic filter, and the third pixel value is read from binning of multiple pixels corresponding to the color filter; and a second binning mode in which a third image is obtained according to a fourth pixel value and a fifth pixel value, where the fourth pixel value is read from binning of multiple pixels corresponding to all panchromatic filters in the filter group, and the fifth pixel value is read from binning of multiple pixels corresponding to all color filters in the filter group.

In a second aspect, a terminal in implementations of the disclosure includes an image sensor and a processor. The image sensor includes a filter array and a pixel array. The filter array includes minimal repeating units. Each minimal repeating unit includes multiple filter groups. Each filter group includes a color filter and a panchromatic filter. A waveband of light passing through the color filter is narrower than a waveband of light passing through the panchromatic filter. The color filter and the panchromatic filter each include multiple sub-filters. The pixel array includes multiple pixels. Each pixel corresponds to one sub-filter in the filter array and is configured to receive light passing through the sub-filter to generate an electrical signal. The processor is configured to output an image in at least one of multiple image output modes, where the multiple image output modes includes: a full-size mode in which a first image is obtained according a first pixel value read from each pixel; a first binning mode in which a second image is obtained according to a second pixel value and a third pixel value, where the second pixel value is read from binning of multiple pixels corresponding to the panchromatic filter, and the third pixel value is read from binning of multiple pixels corresponding to the color filter; and a second binning mode in which a third image is obtained according to a fourth pixel value and a fifth pixel value, where the fourth pixel value is read from binning of multiple pixels corresponding to all panchromatic filters in the filter group, and the fifth pixel value is read from binning of multiple pixels corresponding to all color filters in the filter group.

In a third aspect, a non-transitory computer-readable storage medium in implementations of the disclosure includes a computer program which, when executed by one or more processor, cause the processor to execute method of the first aspect.

BRIEF DESCRIPTION OF THE DRAWINGS

In order to more clearly illustrate technical solutions in the implementations of the disclosure or the related art, the following will briefly introduce the drawings that need to be used in the description of the implementations or the related art. Obviously, the accompanying drawings in the following description are only some implementations of the disclosure. Those skilled in the art can also obtain other drawings based on these drawings without creative work.

DETAILED DESCRIPTION

In order to make the purpose, technical solution and advantages of the disclosure clearer, the disclosure will be further described in detail below in conjunction with the accompanying drawings and implementations. It should be understood that the specific implementations described here are only used to explain the disclosure, and are not intended to limit the disclosure.

Figure 1:
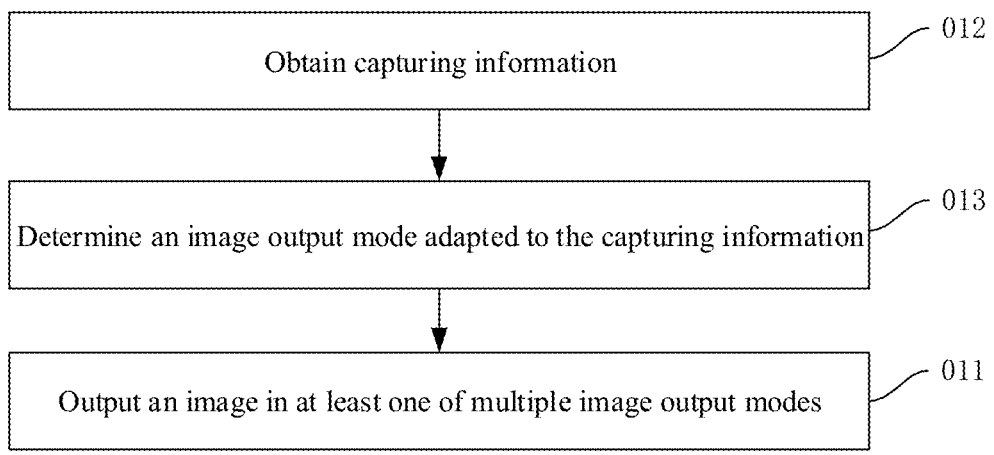
FIG. 1 is a schematic flowchart of an image obtaining method in some implementations of the disclosure.

Referring to FIG. 1, an image obtaining method in implementations of the disclosure is applied to an image sensor 21. The image sensor 21 includes a filter array 22 and a pixel array 23. The filter array 22 includes minimal repeating units 221. Each minimal repeating unit 221 includes multiple filter groups 222. Each filter group 222 includes a color filter 223 and a panchromatic filter 224. A waveband of light passing through the color filter 223 is narrower than a waveband of light passing through the panchromatic filter 224. The color filter 223 and the panchromatic filter 224 are each include multiple sub-filters 225. The pixel array 23 includes multiple pixels 231, where each pixel 231 corresponds to a sub-filter 225 in the filter array 22 and is configured to receive light passing through the corresponding sub-filter 225 to generate an electrical signal. The image obtaining method includes the following.

At block 011, an image is output in at least one of multiple image output modes. The multiple image output modes include a full-size mode, a first binning mode, and a second binning mode. In the full-size mode, a first image is obtained according a first pixel value read from each pixel 231. In the first binning mode, a second image is obtained according to a second pixel value and a third pixel value, where the second pixel value is read from binning of multiple pixels 231 corresponding to the panchromatic filter 224, and the third pixel value is read from binning of multiple pixels 231 corresponding to the color filter 223. In the second binning mode, a third image is obtained according to a fourth pixel value and a fifth pixel value, where the fourth pixel value is read from binning of multiple pixels 231 corresponding to all panchromatic filters 224 in the filter group 222, and the fifth pixel value is read from binning of multiple pixels 231 corresponding to all color filters 223 in the filter group 222.

Figure 2:
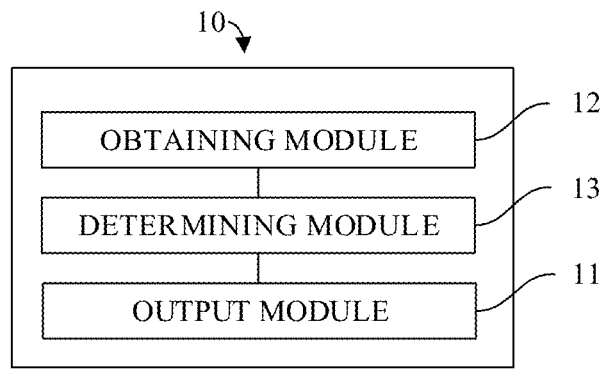
FIG. 2 is a schematic block diagram of an image obtaining apparatus in some implementations of the disclosure.

Referring also to FIG. 2, an image obtaining apparatus 10 in implementations of the disclosure is applied to an image sensor 21. The image obtaining apparatus 10 includes an output module 11. The output module 11 is configured to perform operations at block 011. That is, the output module 11 is configured to output the image in at least one of the multiple image output modes.

Figure 3:
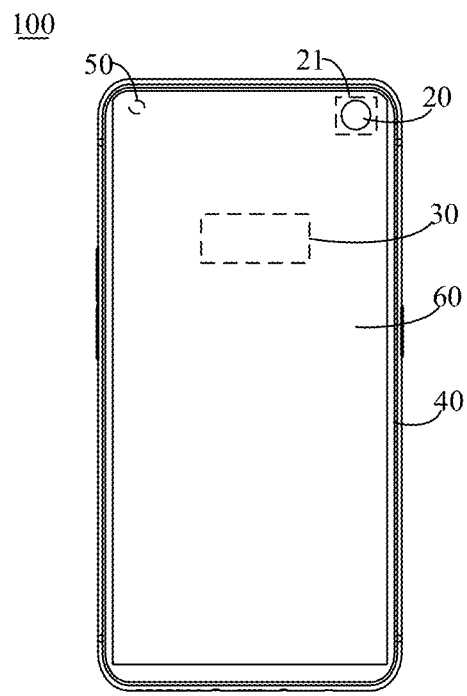
FIG. 3 is a schematic structural diagram of a terminal in some implementations of the disclosure.
Figure 4:
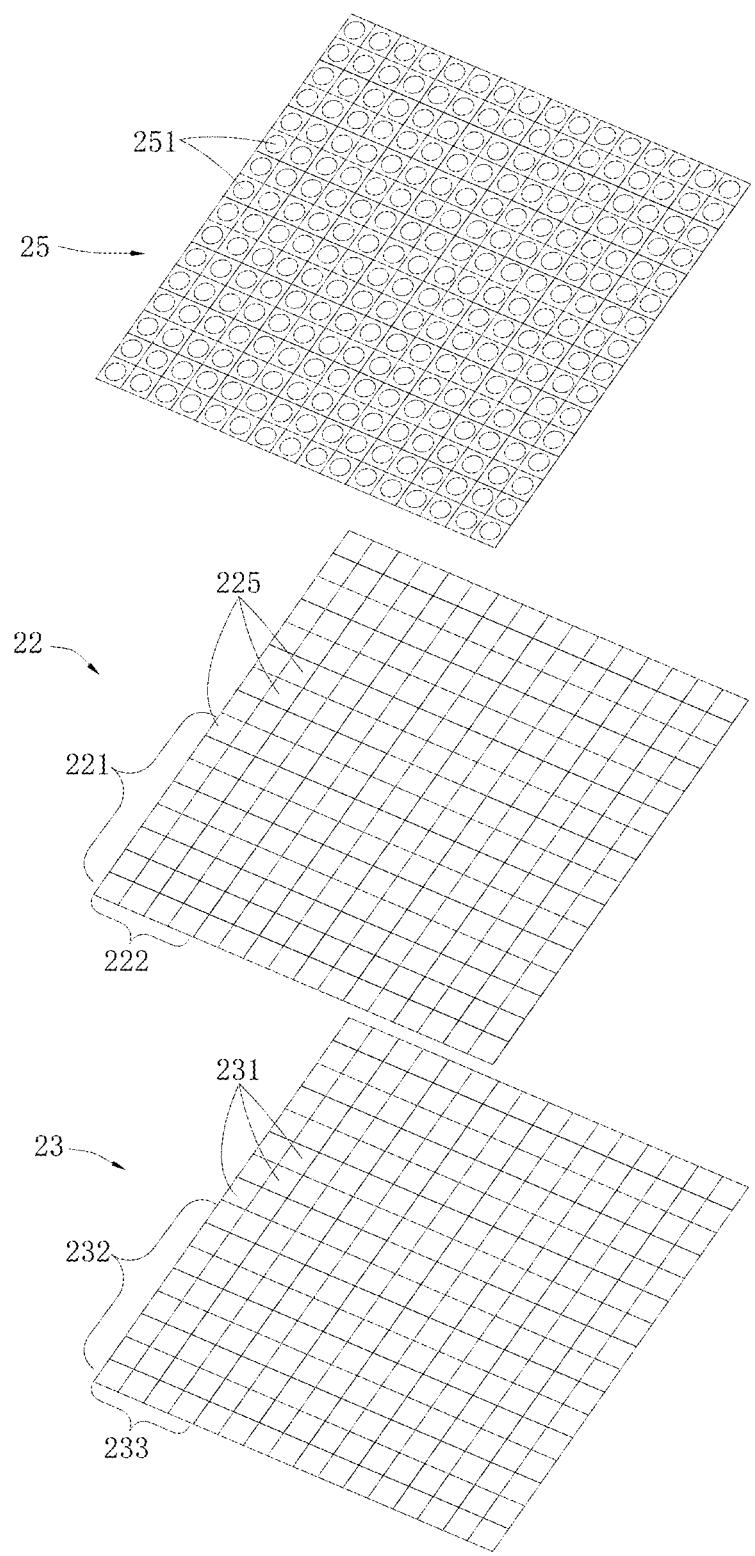
FIG. 4 is a schematic exploded view of an image sensor in some implementations of the disclosure.
Figure 5:
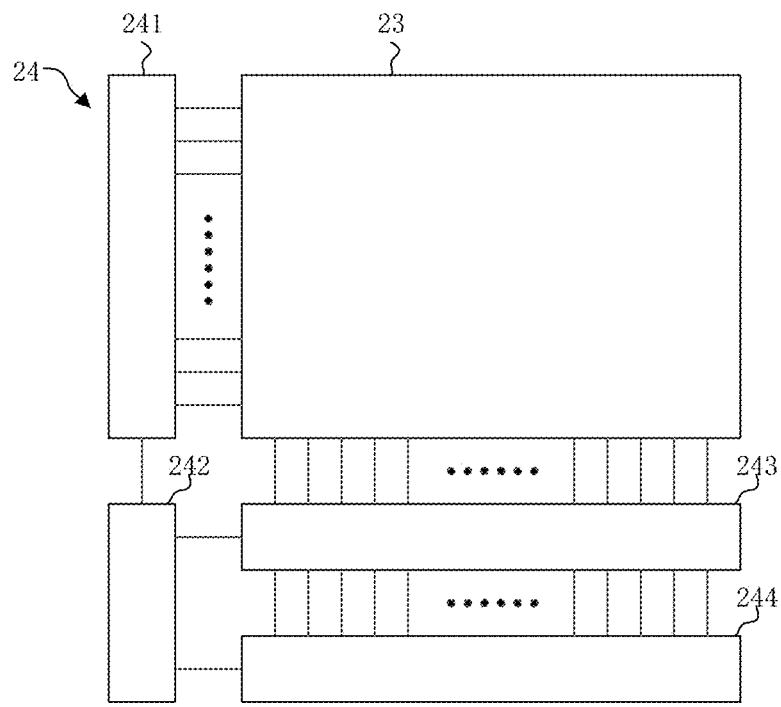
FIG. 5 is a schematic diagram illustrating connection between a pixel array and a readout circuit in some implementations of the disclosure.

Referring also to FIG. 3 to FIG. 5, a terminal 100 in implementations of the disclosure includes an image sensor 21 and a processor 30. The image sensor 21 includes a filter array 22 and a pixel array 23, and the processor 30 is configured to perform operations at block 011. That is, the processor 30 is configured to output the image in at least one of the multiple image output modes.

The terminal 100 includes a mobile phone, a tablet computer, a notebook computer, a teller machine, a gate, a smart watch, a head-mounted display device, etc. It can be understood that the terminal 100 may also be any other device with image processing functions. In the following description, the terminal 100 is a mobile phone, but the terminal 100 is not limited to the mobile phone. The terminal 100 includes a camera 20, a processor 30, and a housing 40. Both the camera 20 and the processor 30 are disposed in the housing 40. The housing 40 may also be configured to receive functional modules such as a power supply device and a communication device of the terminal 100, so that the housing 40 provides dust-proof, drop-proof, water-proof, etc. for the functional modules.

The camera 20 may be a front camera, a rear camera, a side camera, an under-screen camera, etc., which is not limited herein. The camera 20 includes a lens and an image sensor 21. When the camera 20 captures an image, light passes through the lens and reaches the image sensor 21. The image sensor 21 is configured to convert the light signal incident on the image sensor 21 into an electrical signal.

Referring to FIG. 4 and FIG. 5, the image sensor 21 includes a microlens array 25, a filter array 22, a pixel array 23, and a readout circuit 24.

The microlens array 25 includes multiple microlenses 251. The microlenses 251, the sub-filters 225 and the pixels 231 are arranged in one-to-one correspondence. The microlens 251 is configured to converge the incident light, the converged light passes through the corresponding sub-filter 225 to be received by the corresponding pixel 231, and the pixel 231 generates an electrical signal according to the received light.

Multiple minimal repeating units are arranged in the filter array 22 and the pixel array 23. For convenience of description, the minimal repeating units 221 in the filter array 22 are hereinafter referred to as first minimal repeating units, and the minimal repeating units 232 in the pixel array 23 are hereinafter referred to as second minimal repeating units.

The first minimal repeating unit includes multiple filter groups 222. For example, the first minimal repeating unit includes 2 filter groups 222, 3 filter groups 222, 4 filter groups 222, 5 filter groups 222, or 6 filter groups 222, etc. In implementations of the disclosure, the first minimal repeating unit includes 4 filter groups 222, and the 4 filter groups 222 are arranged in a matrix.

Figure 6:
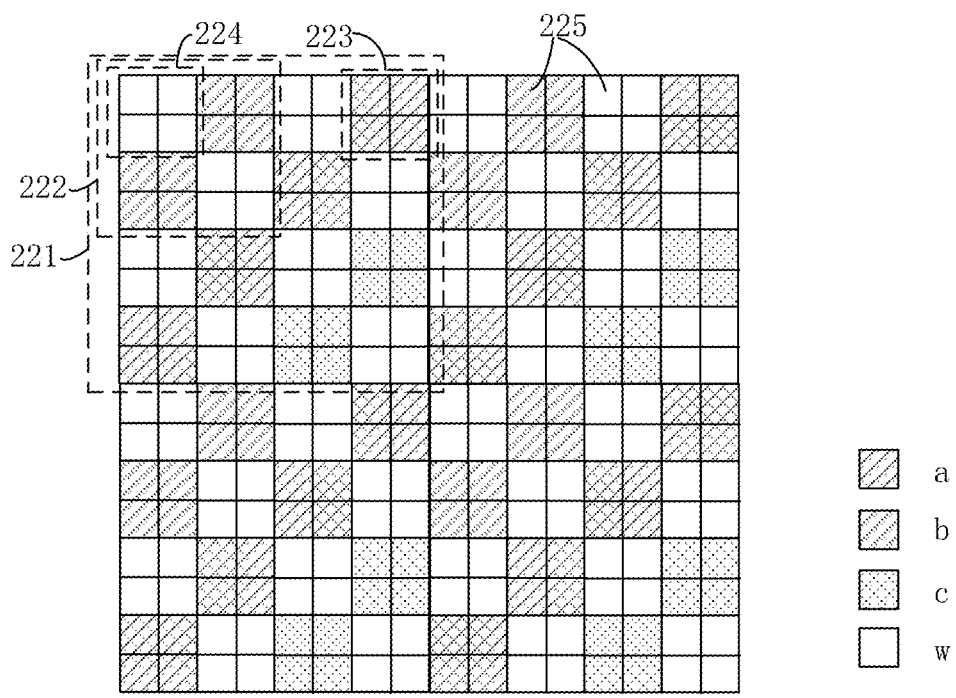
FIG. 6 is a schematic plane view of a filter array in some implementations of the disclosure.

Referring to FIG. 6, each filter group 222 includes a color filter 223 (such as the rectangular part formed by 4 sub-filters 225 with filled pattern in FIG. 6) and a panchromatic filter 224 (such as the rectangular part formed by 4 sub-filters 225 with unfilled pattern in FIG. 6). A waveband of light passing through the color filter 223 is narrower than a waveband of light passing through the panchromatic filter 224. For example, the waveband of light passing through the color filter 223 may correspond to a waveband of red light, a waveband of green light, or a waveband of blue light, and the waveband of light passing through the panchromatic filter 224 is a waveband of all visible light. That is, the color filter 223 only allows light of a specific color to pass through, while the panchromatic filter 224 allows light of all colors to pass through. The waveband of the light passing through the color filter 223 may also correspond to a waveband of other colored light, such as magenta light, violet light, cyan light, yellow light, etc., which is not limited herein.

A sum of the number of color filters 223 and the number of panchromatic filters 224 in the filter array 222 is 4, 9, 16, or 25, etc., which is suitable for a matrix arrangement. In this implementation, the sum of the number of color filters 223 and the number of panchromatic filters 224 in the filter array 222 is 4.

Figure 7A:
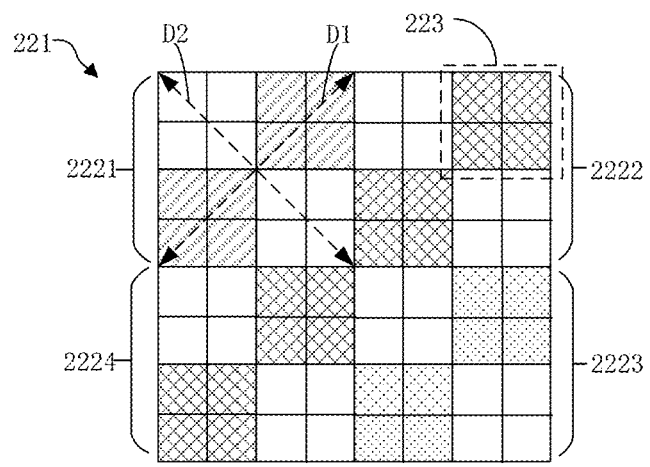
FIG. 7A is a schematic plane view of a minimal repeating unit of a filter array in some implementations of the disclosure.

A ratio of the number of color filters 223 to the number of panchromatic filters 224 may be 1:3, 1:1, or 3:1. For example, the ratio of the number of color filters 223 to the number of panchromatic filters 224 is 1:3, if the number of color filter 223 is 1, the number of panchromatic filters 224 is 3. In this case, with more panchromatic filters 224, the imaging quality under dark light is better. Optionally, the ratio of the number of color filters 223 and the number of panchromatic filters 224 is 1:1, if the number of color filters 223 is 2, and the number of panchromatic filters 224 is 2. In this case, not only better color performance can be obtained, but also the imaging quality under dark light can be better. Optionally, the ratio of the number of color filters 223 and the full panchromatic filters 224 is 3:1, if the number of color filters 223 is 3, the number of panchromatic filter 224 is 1. In this case, better color performance can be obtained, and the imaging quality under dark light can be improved. In the implementations of the disclosure, as illustrated in FIG. 7A, the number of color filters 223 is 2, the number of panchromatic filters 224 is 2, and the two color filters 223 and the two panchromatic filters 224 are arranged in a matrix. The two color filters 223 are arranged in a first diagonal direction D1 of the rectangle corresponding to the matrix (specifically on the first diagonal line D1), and the two panchromatic filters 224 are arranged in a second diagonal direction D2 of the rectangle corresponding to the matrix (specifically on the second diagonal line D2), where the first diagonal direction D1 is different from the second diagonal direction D2 (for example, the first diagonal direction D1 and the second diagonal direction D2 is not parallel). In this way, the color performance and the imaging quality under dark light can be balanced. In other implementations, one color filter 223 and one panchromatic filter 224 are arranged on the first diagonal line D1, and another color filter 223 and another panchromatic filter 224 are arranged on the second diagonal line D2.

In the first minimal repeating unit, the color corresponding to the waveband of light passing through the color filter 222 in the filter group 222 includes color a, color b, and/or color c. For example, in the first minimal repeating unit, the color corresponding to the waveband of light passing through the color filter 223 in the filter group 222 includes color a, color b and color c; or color a, color b or color c; or color a and color b; or color b and color c; or color a and color c. Color a is red, color b is green, and color c is blue. Optionally, color a is magenta, color b is cyan, and color c is yellow, etc., which are not limited herein. In this implementation of the present disclosure, the colors corresponding to the wavebands of the light passing through the color filters 223 in the filter group 222 in the first minimal repeating unit include color a, color b and color c, where color a is green, color b is red, and color c is blue. Specifically, the colors corresponding to the color filters 223 in the four filter groups 222 in the first minimal repeating unit (as illustrated in FIG. 7A to FIG. 7D, which are respectively a first filter group 2221, a second filter group 2222, a third filter group 2223, and a fourth filter group 2224) are red, green, blue, and green respectively, so as to form an arrangement similar to Bayer array. The colors corresponding to the first filter group 2221, the second filter group 2222, the third filter group 2223, and the fourth filter group 2224 may also be green, red, green, and blue, or blue, green, red, and green, etc., which are not limited herein.

The color filter 223 and the panchromatic filter 224 each include multiple sub-filters 225. For example, the color filter 223 and the panchromatic filter 224 each include 2 sub-filters 225, 3 sub-filters 225, 4 sub-filters 225, 5 sub-filters 225, or 6 sub-filters 225, etc. In the implementation of the disclosure, for the convenience of matrix arrangement, the color filter 223 includes 4 color sub-filters, and the panchromatic filter 224 includes 4 panchromatic sub-filters. The light passing through the sub-filters 225 in a same color filter 223 (or panchromatic filter 224) has a same waveband.

Referring to FIG. 7A, in an example, the sum of the number of color filters 223 and the number of panchromatic filters 224 in the filter group is 4, and the ratio of the number of color filters 223 to the number of panchromatic filters 224 is 1:1. Then the first minimal repeating unit includes 64 sub-filters 225 which may be arranged in 8 rows and 8 columns as follows.

w w b b w w a a
w w b b w w a a
b b w w a a w w
b b w w a a w w
w w a a w w c c
w w a a w w c c
a a w w c c w w
a a w w c c w w

In the above arrangement, w represents a panchromatic sub-filter, and a, b, and c each represent a color sub-filter. The panchromatic sub-filter refers to a sub-filter 225 that can filter out all light outside the visible light band. The color sub-filter includes a red sub-filter, a green sub-filter, a blue sub-filter, a magenta sub-filter, a cyan sub-filter, and a yellow sub-filter. The red sub-filter is a sub-filter 225 that can filter out all light other than red light, the green sub-filter is a sub-filter 225 that can filter out all light other than green light, the blue sub-filter is a sub-filter 225 that can filter out all light other than blue light, the magenta sub-filter is a sub-filter 225 that can filter out all light other than magenta light, the cyan sub-filter a sub-filter 225 that can filter out all light other than cyan light, and the yellow sub-filter is a sub-filter 225 that can filter out all light other than yellow light.

a may represent one of a red sub-filter, green sub-filter, blue sub-filter, magenta sub-filter, cyan sub-filter, and yellow sub-filter, b may represent one of the red sub-filter, green sub-filter, blue sub-filter, magenta sub-filter, cyan sub-filter, and yellow sub-filter, and c may represent one of the red sub-filter, green sub-filter, blue sub-filter, magenta sub-filter, cyan sub-filter, and yellow sub-filter. For example, b represents the red sub-filter, a represents the green sub-filter, and c represents the blue sub-filter. Optionally, c represents the red sub-filter, a represents the green sub-filter, and b represents the blue sub-filter. For another example, c represents the red sub-filter, a represents the green sub-filter, and b represents the blue sub-filter. Optionally, a represents the red sub-filter, b represents the blue sub-filter, and c represents the green sub-filter. For another example, b represents the magenta sub-filter, a represents the cyan sub-filter, and c represents the yellow sub-filter. In other implementations, the color filters may further include sub-filters of other colors, such as an orange sub-filter, a purple sub-filter, etc., which are not limited herein.

Figure 7B:
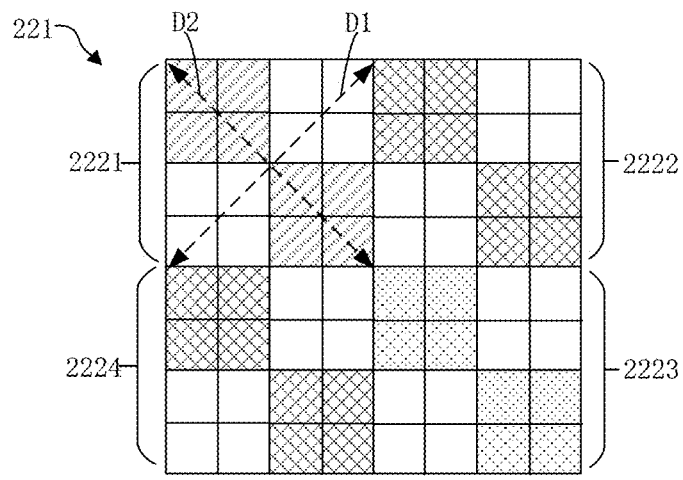
FIG. 7B is a schematic plane view of a minimal repeating unit of a filter array in some implementations of the disclosure.

Referring to FIG. 7B, in another example, the sum of the number of color filters 223 and the number of panchromatic filters 224 in the filter group 222 is 4, and the ratio of the number of color filters 223 to the number of panchromatic filters 224 is 1:1. Then the first minimal repeating unit includes 64 sub-filters 225 which may further be arranged in 8 rows and 8 columns as follows.

b b w w a a w w
b b w w a a w w
w w b b w w a a
w w b b w w a a
a a w w c c w w
a a w w c c w w
w w a a w w c c
w w a a w w c c

Figure 7C:
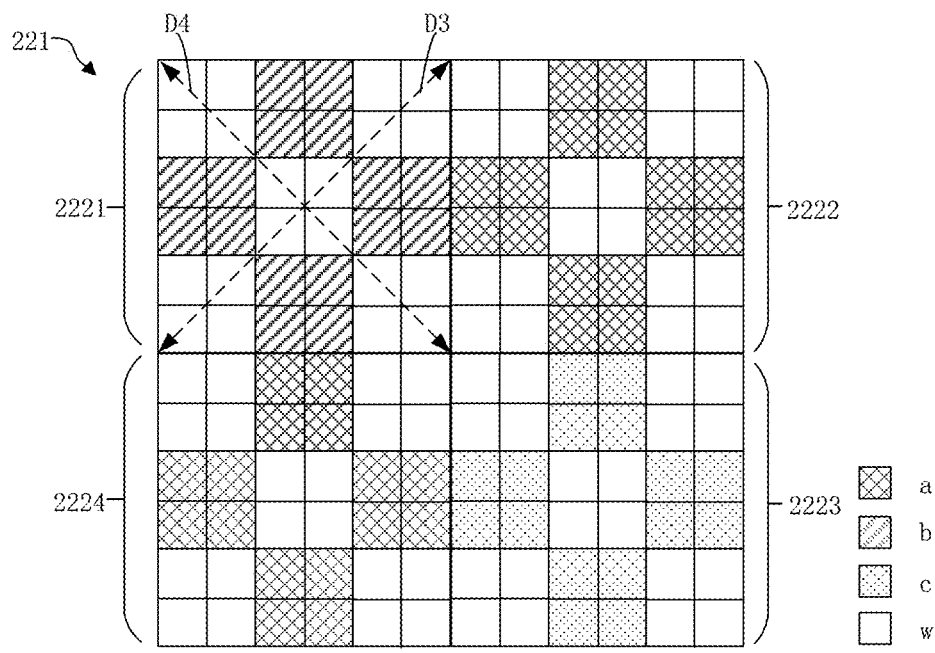
FIG. 7C is a schematic plane view of a minimal repeating unit of a filter array in some implementations of the disclosure.

Referring to FIG. 7C, in another example, the sum of the number of color filters 223 and the number of panchromatic filters 224 in the filter group 222 is 9. The colors filters 223 and the panchromatic filters 224 in the filter group 222 are arranged in a matrix. The ratio of the number of color filters 223 to the number of panchromatic filters 224 is 4:5. Then the number of color filters 223 is 4, and the number of panchromatic filters 224 is 5. In this case, with more panchromatic filters 224, the imaging quality under dark light can be better. The panchromatic filters 224 are arranged in a third diagonal line D3 and a fourth diagonal line D4 of the rectangle corresponding to the filter group 222, where the third diagonal line D3 and the fourth diagonal line D4 are diagonal lines of the rectangle. The color filters 223 are arranged in a direction of the third diagonal line D3 or a direction of the fourth diagonal line D4, but are not in the third diagonal line D3 or the fourth diagonal line D4. The direction of the third diagonal line D3 and the direction of the fourth diagonal line D4 are different (for example, the direction of the third diagonal line D3 and the direction of the fourth diagonal line D4 are not parallel). Specifically, the first minimal repeating unit includes 144 sub-filters 225 which may be arranged in 12 rows and 12 columns as follows:

w w b b w w w w a a w w
w w b b w w w w a a w w
b b w w b b a a w w a a
b b w w b b a a w w a a
w w b b w w w w a a w w
w w b b w w w w a a w w
w w a a w w w w c c w w
w w a a w w w w c c w w
a a w w a a c c w w c c
a a w w a a c c w w c c
w w a a w w w w c c w w
w w a a w w w w c c w w

Figure 7D:
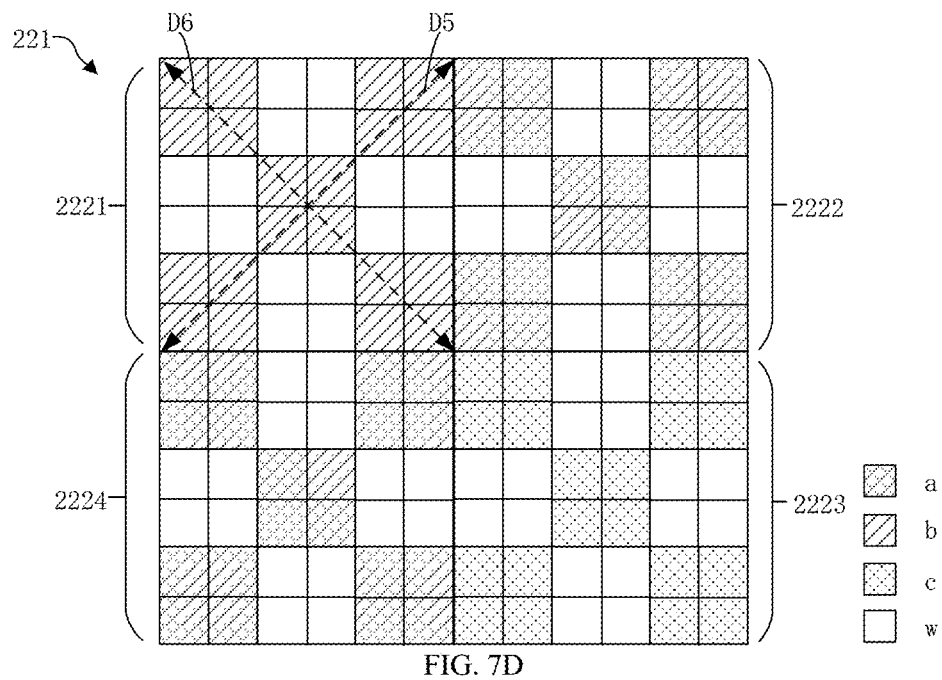
FIG. 7D is a schematic plane view of a minimal repeating unit of a filter array in some implementations of the disclosure.

Referring to FIG. 7D, in another example, the sum of the number of color filters 223 and the number of panchromatic filters 224 in the filter group 222 is 9. The colors filters 223 and the panchromatic filters 224 in the filter group 222 are arranged in a matrix. The ratio of the number of color filters 223 to the number of panchromatic filters 224 is 5:4. Then the number of color filters 223 is 5, and the number of panchromatic filters 224 is 4. In this case, with more color filters 224, better color performance can be obtained, and the imaging quality under dark light can be improved. The color filters 223 are arranged in a fifth diagonal line D5 and a sixth diagonal line D6 of the rectangle corresponding to the filter group 222, where the fifth diagonal line D5 and the sixth diagonal line D6 are diagonal lines of the rectangle. The panchromatic filters 223 are arranged in a direction of the fifth diagonal line D5 or a direction of the sixth diagonal line D6, but are not in the fifth diagonal line D5 or the sixth diagonal line D6. The direction of the fifth diagonal line D5 and the direction of the sixth diagonal line D6 are different (for example, the direction of the fifth diagonal line D5 and the direction of the sixth diagonal line D6 are not parallel). Specifically, the first minimal repeating unit includes 144 sub-filters 225 which may further be arranged in 12 rows and 12 columns as follows:

b b w w b b a a w w a a
b b w w b b a a w w a a
w w b b w w w w a a w w
w w b b w w w w a a w w
b b w w b b a a w w a a
b b w w b b a a w w a a
a a w w a a c c w w c c
a a w w a a c c w w c c
w w a a w w w w c c w w
w w a a w w w w c c w w
a a w w a a c c w w c c
a a w w a a c c w w c c

In this implementations, the image sensor 21, the camera 20, and the terminal 100 each include the panchromatic filter 224. For the problem that the imaging effect after adjusting the exposure parameters is limited and the imaging effect is still poor, the image sensor 10 can obtain more light, so that there is no need to adjust the capturing parameter, and the imaging quality in dark light can be improved without affecting the stability of capturing. When imaging in dark light, stability and quality are taken into consideration, and the stability and quality are relatively high. In addition, the panchromatic filter 224 and the color filter 223 are each formed by 4 sub-filters 225. When imaging under dark light, pixels 231 corresponding to the 4 sub-filters 225 are binned and output, so as to obtain an image with higher signal-to-noise ratio (SNR). For a scene with sufficient light, the pixel 231 corresponding to each sub-filter 225 can be output separately, so as to obtain an image with high definition and high SNR.

Figure 8:
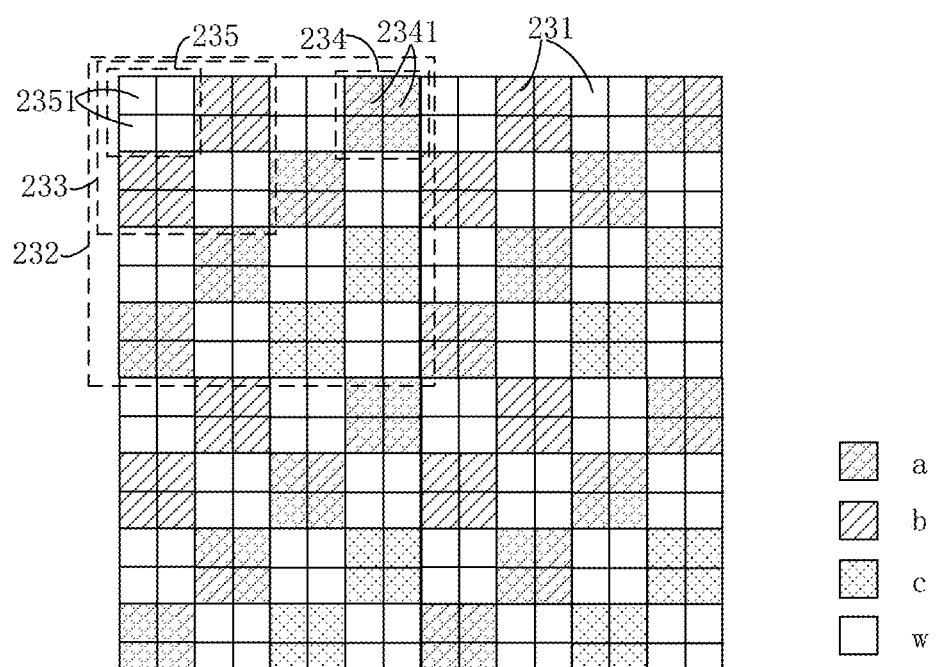
FIG. 8 is a schematic plane view of a pixel array in some implementations of the disclosure.

Referring also to FIG. 4 and FIG. 8, the pixel array 23 includes multiple pixels 231, where each pixel 231 corresponds to one sub-filter 225 and is configured to receive light passing through the corresponding sub-filter 225 to generate an electrical signal. The processor 30 processes the electrical signal to obtain a pixel value of the pixel 231.

Figure 9:
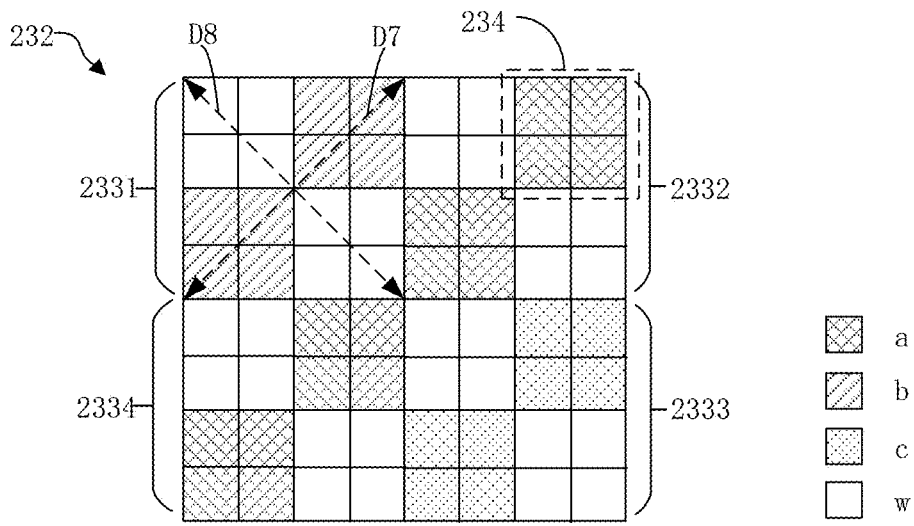
FIG. 9 is a schematic plane view of a minimal repeating unit of a pixel array in some implementations of the disclosure.

The second minimal repeating unit includes multiple pixel groups 233 corresponding to the filter groups 222 in the first minimal repeating unit. The second minimal repeating unit includes 4 pixel groups 233 arranged in a matrix, wherein each pixel group 233 corresponds to one filter group 222. As illustrated in FIG. 9, the 4 pixel groups 233 include the first pixel group 2331, the second pixel group 2332, the third pixel group 2333, and the fourth pixel group 2334. The first pixel group 2331 is arranged corresponding to the first filter group 2221, the second pixel group 2332 is arranged corresponding to the second filter group 2222, the third pixel group 2333 is arranged corresponding to the third filter group 2223, and the fourth pixel group 2334 is arranged corresponding to the fourth filter group 2224.

The pixel group 233 includes a color pixel unit(s) 234 and a panchromatic pixel unit(s) 235, where the color pixel units 234 are arranged in one-to-one correspondence with the color filters 223, and the panchromatic pixel units 235 are arranged in one-to-one correspondence with the panchromatic filters 224. In this implementation, there are 2 color pixel units 234 and 2 panchromatic pixel units 235, where the 2 color pixel units 234 and the two panchromatic pixel units 235 are arranged in a matrix. The 2 color pixel units 234 are arranged in a seventh diagonal line D7 of the rectangle corresponding to the matrix, and the 2 panchromatic pixel units 235 are arranged in an eighth diagonal line D8 of the rectangle corresponding to the matrix.

The color pixel unit 234 includes color pixels 2341, and the panchromatic pixel unit 235 includes panchromatic pixels 2311. The color pixels 2341 are arranged in one-to-one correspondence with the sub-filters 225 of the color filter 223 (hereinafter referred to as the color sub-filters), and the panchromatic pixels 2311 are arranged in one-to-one correspondence with the sub-filters 225 of the panchromatic filter 224 (hereinafter referred to as the panchromatic sub-filters). Corresponding to the color filter 223 including 4 color sub-filters and the panchromatic filter 224 including 4 panchromatic sub-filters, the color pixel unit 234 includes 4 color pixels 2341 and the panchromatic includes 4 panchromatic pixels 2311. The color pixel 2341 can receive light of a specific color (such as red, green, or blue) passing through the corresponding color sub-filter to generate an electrical signal, and the panchromatic pixel 2311 can receive light of all colors passing through the corresponding panchromatic sub-filter to generate an electrical signal. The processor 30 can obtain pixel values corresponding to the panchromatic pixels 2311 and the color pixels 2341 according to the electrical signals.

The color of the color pixel 2341 corresponds to the waveband of light passing through the corresponding color sub-filter. The color of the color pixel 2341 in the second minimal repeating unit also includes color a, color b and color c. For example, the wavelength bands of light passing through the color sub-filters in the first minimal repeating unit include a red light waveband, a green light waveband and a blue light waveband, and thus the colors for the color pixels 2341 include red, green, and blue. Corresponding to the colors corresponding to the 4 filter groups 222, in the color pixel units in the 4 pixel groups 233 (i.e., the first pixel group 2331, the second pixel group 2332, the third pixel group 2333 and the fourth pixel group 2334), the colors for the color pixels 2341 are red, green, blue, and green respectively, that is, color a is green, color b is red, and color c is blue. It can be understood that the color of the color pixel 2341 is not the color of the color pixel 2341 per se, but the color corresponding to the waveband of light passing through the color sub-filter corresponding to the color pixel 2341.

The color of the panchromatic pixel 2311 in the second minimal repeating unit corresponds to the waveband of the light passing through the corresponding panchromatic sub-filter in the first minimal repeating unit. For example, the color of the panchromatic pixel 2311 includes color W. The waveband of the light passing through the panchromatic sub-filter is the visible light band, and the color W is white. It can be understood that the color of the panchromatic pixel 2311 is not the color of the panchromatic pixel 2311 per se, but the color corresponding to the waveband of light passing through the panchromatic sub-filter corresponding to the panchromatic pixel 2311.

Referring to FIG. 5, the readout circuit 24 is electrically connected with the pixel array 23. The readout circuit is configured to control exposure of the pixel array 23 and readout of pixel values of the pixels 231.

The readout circuit 24 includes a vertical drive unit 241, a control unit 242, a column processing unit 243, and a horizontal drive unit 244.

The vertical drive unit 241 includes a shift register and an address decoder. The vertical drive unit 241 includes readout scan and reset scan functions. The readout scan refers to sequentially scanning the pixels 231 row by row, and reading signals from these pixels 231 row by row. For example, the signal output from each pixel 231 in the selected and scanned pixel row is transmitted to the column processing unit 243. The reset scan is for resetting the charge, where the photo-charges in the photoelectric conversion element of the pixel 231 are discarded so that accumulation of new photo-charges can be started.

The signal processing performed by the column processing unit 243 is correlated double sampling (CDS) processing. In the CDS process, the reset level and signal level output from each pixel 231 in the selected pixel row are taken out, and a difference between the levels is calculated. Thus, signals of the pixels 231 in one row are obtained. The column processing unit 243 may have an analog-to-digital (A/D) conversion function for converting an analog pixel signal into a digital format.

The horizontal drive unit 244 includes a shift register and an address decoder. The horizontal drive unit 244 sequentially scans the pixel array 11 column by column. Through the selection scan operation performed by the horizontal drive unit 244, each pixel column is sequentially processed by the column processing unit 243, and is sequentially output.

The control unit 242 configures timing signals according to the operation mode, and uses various timing signals to control the vertical drive unit 241, the column processing unit 243 and the horizontal drive unit 244 to work together.

Specifically, the processor 30 may select at least one of multiple image output modes to output an image for the current scene. For example, in order to obtain an image with highest-definition, the user may select the full-size mode among multiple image output modes to output the image. In the full-size mode, the first pixel value is output from each pixel 231, thereby generating an image with a resolution equal to the resolution of the image sensor 21. For example, if the resolution of the image sensor 21 is 48 million pixels, then the first image has a size of 48 million pixels.

For another example, if the current ambient brightness is not sufficient, in order to improve the SNR of the image, the user may select the first binning mode among the multiple image output modes to output the image. In the first binning mode, the electrical signals of the 4 panchromatic pixels 2311 in the panchromatic pixel unit 235 corresponding to the panchromatic filter 224 will be binned and readout to obtain a second pixel value, and the electrical signals of the 4 color pixels 2341 in the corresponding color pixel unit 234 will be binned and readout to obtain a third pixel value. According to all third pixel values and fourth pixel values, an image with a resolution equal to ¼ of the resolution of the sensor 21 may be generated. For example, if the resolution of the image sensor 21 is 48 million pixels, then a second image with a size of 12 million pixels can be generated.

For another example, if the current ambient brightness is seriously insufficient, in order to maximize the SNR of the image, the user may select the second binning mode among the multiple image output modes to output an image. In the second binning mode, the electrical signals of the 8 panchromatic pixels 2311 in the panchromatic pixel units 235 corresponding to all the panchromatic filters 224 in each filter group 222 will be binned and readout to obtain a fourth pixel value, and the electrical signals of the 8 color pixels 2341 in the color pixel units 234 corresponding to all color filters 223 in each filter group 222 will be binned and readout to obtain a fifth pixel value. An intermediate image is generated from all fourth pixel values, and an intermediate image is generated from all fifth pixel values. After the two intermediate images are merged, an image with a resolution equal to $1/16$ of the resolution of the image sensor 21 can be generated. For example, if the resolution of the image sensor 21 is 48 million pixels, a third image with a size of 3 million pixels can be generated.

Binning and reading electrical signals may refer to summing the electrical signals accumulated by multiple pixels 231 to obtain a summed electrical signal, and then determine the corresponding pixel value according to the summed electrical signal. Optionally, binning and reading of electrical signals may also refer to readout the pixel value of each pixel 231 and then sum the pixel values to be a pixel value of one pixel.

The processor 30 may simultaneously select multiple image output modes to output the first image, the second image, and/or the third image. For example, the processor 30 simultaneously outputs the first image and the second image, or the second image and the third image, or the first image and the third image, or the first image, the second image and the third image. The user can select a more satisfactory image from the multiple images output in the multiple image output modes.

In the image obtaining method, the image obtaining apparatus, and the terminal 100 in implementations of the disclosure, the image may be output in at least one of the multiple image output modes, so that different image output modes can be used for different scenes. In this way, the adaptability to different scenes is strong, and a better balance between definition and SNR can be achieved, thus improving imaging effects in different scenarios.

Referring again to FIG. 1, in some implementations, the image obtaining method includes the following.

At block 012, capturing information is obtained, where the capturing information includes at least one of ambient brightness or a capturing parameter.

At block 013, the image output mode adapted to the capturing information is determined.

Referring again to FIG. 2, in some implementations, the image obtaining apparatus 10 further includes an obtaining module 12 and a determining module 13. The obtaining module 12 and the determining module 13 are configured to perform operations at block 012 and block 103 respectively. That is, the obtaining module 12 is configured to obtain the capturing information, and the determining module 13 is configured to determine the image output mode adapted to the capturing information.

Referring again to FIG. 3, in some implementations, the processor 30 is further configured to perform operations at block 012 and block 013. That is, the processor 30 is further configured to obtain the capturing information and determine the image output mode adapted to the capturing information.

Specifically, the processor 30 first obtains the capturing information, and the capturing information includes at least one of ambient brightness and the capturing parameter. For example, the capturing information includes the ambient brightness, or the capturing information includes the capturing parameter, or the capturing information includes ambient brightness and the capturing parameter. The capturing parameter may include a capturing mode, an exposure parameter, and the like. In this implementation, the capturing parameter exemplarily includes the ambient brightness and the capturing parameter, where the capturing parameter includes the capturing (shooting) mode.

The processor 30 may obtain the current capturing mode and an ambient-light intensity signal sensed by an optical sensor 50 (illustrated in FIG. 3) of the terminal 100, and then determine the ambient brightness according to the ambient-light intensity signal. Optionally, the processor 30 may control the camera 20 to capture an image, and then determine the ambient brightness according to gray value distribution of the captured image. Optionally, during capturing an image, in order to achieve better capturing results under different ambient brightness, generally the exposure parameter such as an aperture size, sensitivity, etc. will be automatically adjusted. The ambient brightness has a mapping relationship with the exposure parameter. The processor 30 may determine the ambient brightness according to the exposure parameter when the image is captured.

After obtaining the ambient brightness and the capturing parameter, the processor 30 may determine the image output mode adapted to the ambient brightness and/or the shooting parameter. For example, the processor 30 may determine an image output mode adapted to the capturing mode and the ambient brightness.

Since the capturing mode generally needs to be actively selected by the user, the processor 30 can determine the image output mode preferentially according to the capturing mode. For example, when the capturing mode is a full-size mode, the processor 30 determines the adapted image output mode as the full-size mode. For another example, if the capturing mode is a high-resolution mode, the processor 30 determines the adapted image output mode as the first binning mode. For another example, if the capturing mode is a low-resolution mode, the processor 30 determines the adapted image output mode as the second binning mode.

When no capturing mode is selected, the processor 30 may determine an image output mode adapted to the ambient brightness.

For example, when the ambient brightness is high (for example, the ambient brightness is greater than a first ambient-brightness threshold), the processor 30 may determine that the adapted image output mode is the full-size mode. When the ambient brightness is normal (for example, the ambient brightness is greater than a second ambient-brightness threshold and less than the first ambient-brightness threshold), the processor 30 may determine the adapted image output mode as the first binning mode. When the ambient brightness is low (for example, the ambient brightness is less than the second ambient-brightness threshold), the processor 30 may determine the adapted image output mode as the second binning mode. In this way, the adapted image output mode can be selected according to different ambient brightness, and a better balance between the definition and the SNR can be achieved, thus ensuring that the definition and the SNR will not be too low and thereby improving the image quality.

After determining the image output mode, the processor 30 can control the image sensor 21 to output a corresponding image according to the adapted image output mode. As the capturing information changes, the image output mode can be changed in real time. The processor 30 obtains the capturing information in real time and determines the image output mode every predetermined time, so as to ensure the real-time adaptation of the image output mode to the current capturing information. Moreover, the image sensor 21 includes panchromatic filters 224, which can increase the amount of light admitted to the pixels and improve the imaging effect under dark light.

The corresponding image output mode can be determined according to the capturing information, so that for scenes with different capturing information such as the ambient brightness and the capturing parameter, the appropriate image output mode can be selected, which can obtain a better balance between definition and signal-to-noise ratio and has strong adaptability to different scenes, thus improving the imaging effect in different scenes.

Figure 10:
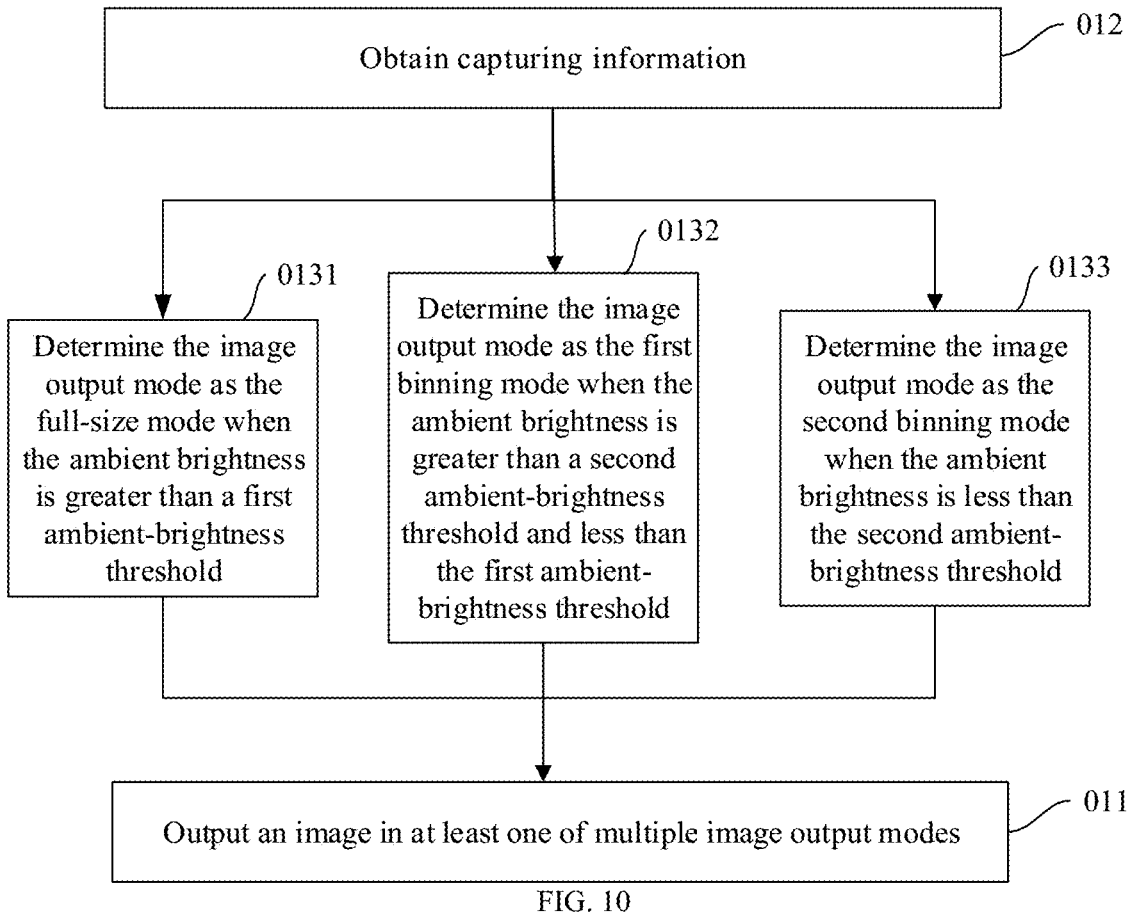
FIG. 10 is a schematic flowchart of an image obtaining method in some implementations of the disclosure.

Referring to FIG. 10, in some implementations, operations at block 013 (specifically, determining the image output mode adapted to the ambient brightness) include the following.

At block 0131, the image output mode is determined as the full-size mode when the ambient brightness is greater than a first ambient-brightness threshold.

At block 0132, the image output mode is determined as the first binning mode when the ambient brightness is greater than a second ambient-brightness threshold and less than the first ambient-brightness threshold.

At block 0133, the image output mode is determined as the second binning mode when the ambient brightness is less than the second ambient-brightness threshold. The first ambient-brightness threshold is less than the second ambient-brightness threshold.

Referring again to FIG. 2, in some implementations, the determining module 13 is further configured to perform operations at block 0131, 0132, and 0133. That is, the determining module 13 is further configured to determine the image output mode as the full-size mode when the ambient brightness is greater than the first ambient-brightness threshold, determine the image output mode as the first binning mode when the ambient brightness is greater than the second ambient-brightness threshold and less than the first ambient-brightness threshold, and determine the image output mode as the second binning mode when the ambient brightness is less than the second ambient-brightness threshold.

Referring again to FIG. 3, in some implementations, the processor 30 is further configured to perform operations at block 0131, 0132, and 0133. That is, the processor 30 is further configured to determine the image output mode as the full-size mode when the ambient brightness is greater than the first ambient-brightness threshold, determine the image output mode as the first binning mode when the ambient brightness is greater than the second ambient-brightness threshold and less than the first ambient-brightness threshold, and determine the image output mode as the second binning mode when the ambient brightness is less than the second ambient-brightness threshold.

Specifically, the capturing information obtained by the processor 30 may only include the ambient brightness. When determining the image output mode adapted to the capturing information, the processor 30 determines the image output mode adapted to the ambient brightness. The ambient brightness is easy to obtain, so that the image output mode can be determined simply and quickly.

When the terminal 100 leaves the factory, the first ambient-brightness threshold and the second ambient-brightness threshold less than the first ambient-brightness threshold may be preset. The first ambient-brightness threshold and the second ambient-brightness threshold may be determined according to empirical values, or obtained by testing the terminal 100. For example, the terminal 100 is placed in an environment with adjustable ambient brightness, and by adjusting the ambient brightness, electrical signals of pixels in the image sensor 21 corresponding to the ambient brightness are obtained. For example, a mapping relationship between an average value of the electrical signals of the pixels in the image sensor 21 and the ambient brightness is established. When the pixel value corresponding to the average value is 200, the ambient brightness corresponding to the average value is considered to be the first ambient-brightness threshold, and when the pixel value corresponding to the average value is 150, the ambient brightness corresponding to the average value is considered to be the second ambient-brightness threshold. In this way, the ambient-brightness thresholds are obtained according to the tests on the image sensor 21 of the terminal 100, so that the ambient-brightness thresholds are more suitable for the terminal 100 and more accurate.

When the ambient brightness is greater than the first ambient-brightness threshold (hereinafter referred to as the high-brightness environment), the ambient light is sufficient, and each pixel can obtain a large amount of light. The processor 30 can determine that the adapted image output mode is full-size mode, so as to obtain the first image with high definition and high SNR. When the ambient brightness is greater than the second ambient-brightness threshold and less than or equal to the first ambient-brightness threshold (hereinafter referred to as the medium-brightness environment), there is still more ambient light, but compared with the high-brightness environment, the amount of light that each pixel can obtain is reduced. The processor 30 may determine that the adapted image output mode is the first binning mode, so as to obtain the second image with slightly-reduced definition but improved SNR. When the ambient brightness is less than or equal to the second ambient-brightness threshold (hereinafter referred to as low-brightness environment), there is less ambient light, and the amount of light that each pixel can be obtained is also less. The processor 30 may determine the adapted image output mode is the second binning mode, so as to obtain a third image with reduced resolution but significantly improved SNR. Therefore, by selecting the adapted image output mode for different ambient brightness, a better balance between definition and SNR can be achieved to ensure that the definition and signal-to-noise ratio will not be too low, thereby improving the imaging quality.

Figure 11:
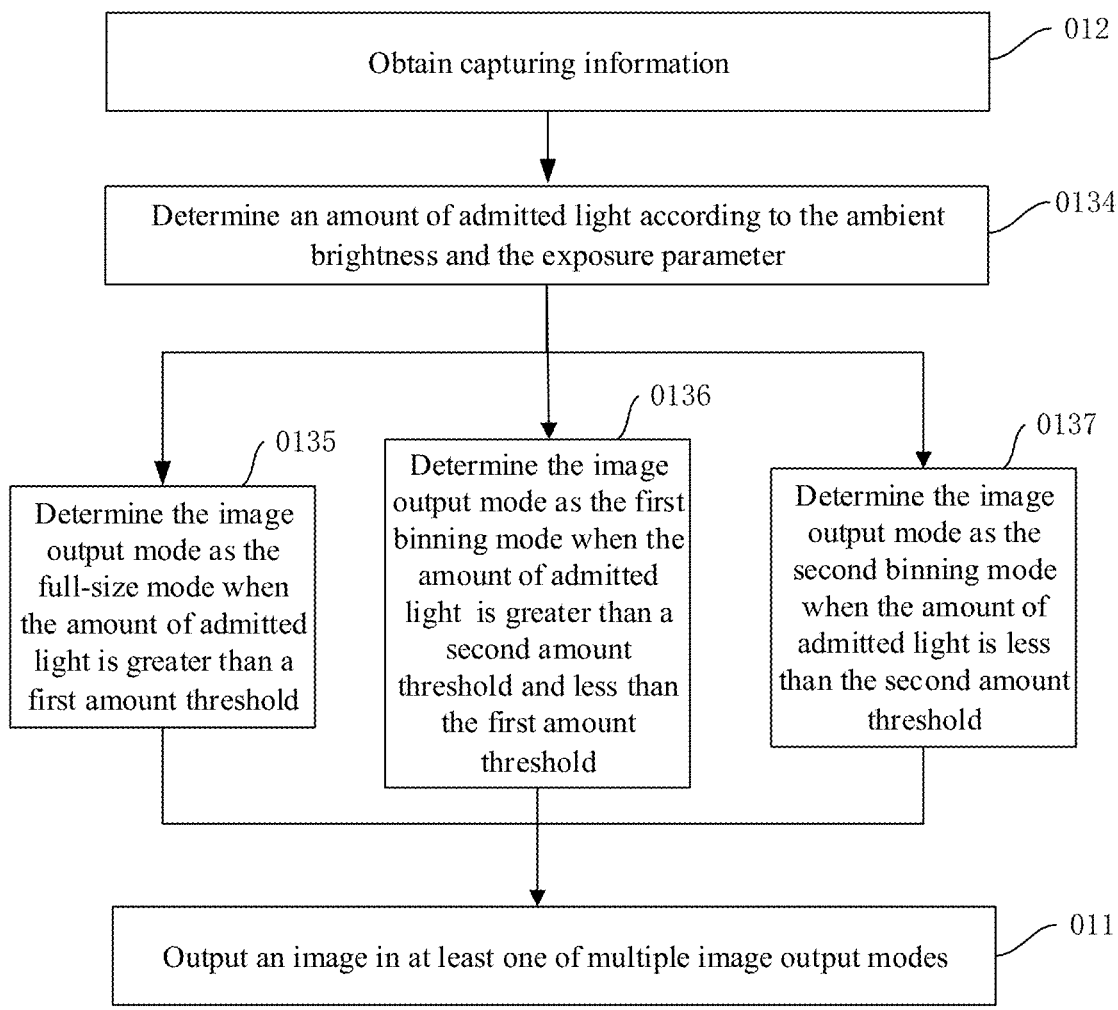
FIG. 11 is a schematic flowchart of an image obtaining method in some implementations of the disclosure.

Referring to FIG. 11, in some implementations, the capturing parameter includes an exposure parameter. The operations at block 013 (specifically, determining the image output mode adapted to the ambient brightness and the capturing parameter) further includes the following.

At block 0134, an amount of admitted light is determined according to the ambient brightness and the exposure parameter.

At block 0135, the image output mode is determined as the full-size mode when the amount of admitted light is greater than a first amount threshold.

At block 0136, the image output mode is determined as the first binning mode when the amount of admitted light is greater than a second amount threshold and less than the first amount threshold.

At block 0137, the image output mode is determined as the second binning mode when the amount of admitted light is less than the second amount threshold.

Referring again to FIG. 2, in some implementations, the determining module 13 is further configured to perform operations at blocks 0134, 0135, 0136, and 0137. That is, the determining module 13 is further configured to determine the amount of admitted light according to the ambient brightness and the exposure parameter, determine the image output mode as the full-size mode when the amount of admitted light is greater than the first amount threshold, determine the image output mode as the first binning mode when the amount of admitted light is greater than the second amount threshold and less than the first amount threshold, and determine the image output mode as the second binning mode when the amount of admitted light is less than the second amount threshold.

Referring again to FIG. 3, in some implementations, the processor 30 is further configured to perform operations at blocks 0134, 0135, 0136, and 0137. That is, the processor 30 is further configured to determine the amount of admitted light according to the ambient brightness and the exposure parameter, determine the image output mode as the full-size mode when the amount of admitted light is greater than the first amount threshold, determine the image output mode as the first binning mode when the amount of admitted light is greater than the second amount threshold and less than the first amount threshold, and determine the image output mode as the second binning mode when the amount of admitted light is less than the second amount threshold.

Specifically, since the camera 20 can adjust the exposure parameter such as aperture size, shutter time, sensitivity, etc. during shooting, pixel values of pixels under different exposure parameters have a significant difference even with the same ambient brightness. For example, in the case where the ambient brightness is unchanged, the larger the aperture size, the larger the amount of admitted light, the more light can be obtained by each pixel, and the larger the pixel value. For another example, in the case where the ambient brightness is unchanged, the longer the shutter time, the larger the amount of admitted, the more light can be obtained by each pixel is, and the larger the pixel value. For another example, in the case where the ambient brightness is unchanged, if the sensitivity is increased, although the actual amount of admitted light will not change, the electrical signal generated from the same amount of admitted light becomes stronger, which may also be equivalent to the larger amount of admitted light, and a pixel value also becomes larger. Therefore, in addition to the ambient brightness, the exposure parameter also influences the selection of the image output mode. For example, if the exposure parameter including the aperture size, the amount of admitted light under a small aperture size and a high-brightness environment may be less than the amount of admitted light under a larger aperture size and a medium-brightness environment. Therefore, the processor 30 may first determine the amount of admitted light according to the ambient brightness and the exposure parameter, and then determine the image output mode according to the amount of admitted light.

When the amount of admitted light is greater than the first amount threshold, the ambient light is sufficient, and each pixel can obtain a large amount of light. The processor 30 can determine that the adapted image output mode is full-size mode, so as to obtain the first image with high definition and high SNR. When the amount of admitted light is greater than the second amount threshold and less than or equal to the first amount threshold, there is still more ambient light, but compared with the high-brightness environment, the amount of light that each pixel can obtain is reduced. The processor 30 may determine that the adapted image output mode is the first binning mode, so as to obtain the second image with slightly-reduced definition but improved SNR. When the amount of admitted light is less than or equal to the second amount threshold, there is less ambient light, and the amount of light that each pixel can be obtained is also less. The processor 30 may determine the adapted image output mode is the second binning mode, so as to obtain the third image with reduced resolution but significantly improved SNR. Therefore, by selecting the adapted image output mode for different ambient brightness and exposure parameters, a better balance between definition and SNR can be achieved to ensure that the definition and signal-to-noise ratio will not be too low, thereby improving the imaging quality.

Figure 12:
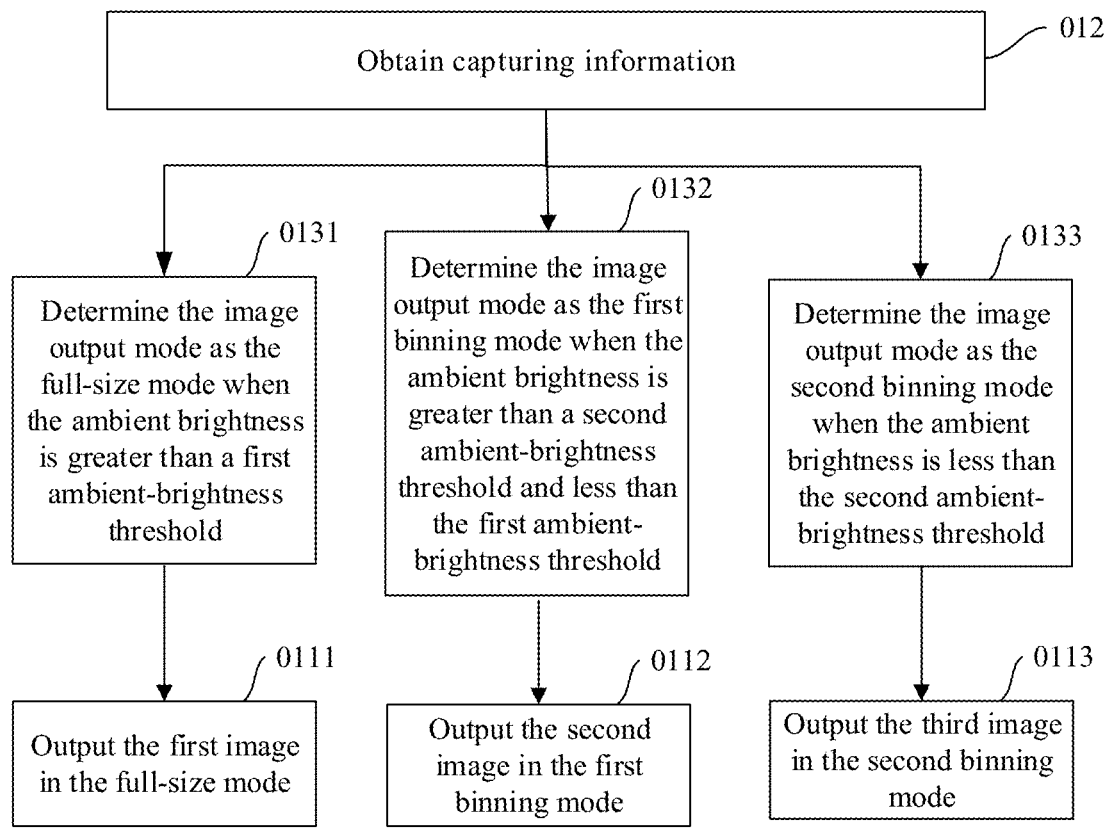
FIG. 12 is a schematic flowchart of an image obtaining method in some implementations of the disclosure.

Referring to FIG. 12, in some implementations, operations at block 011 includes at least one of the following.

At block 0111, the first image is output in the full-size mode.

At block 0112, the second image is output in the first binning mode.

At block 0113, the third image is output in the second binning mode.

Referring again to FIG. 2, in some implementations, the determining module 13 is further configured to perform operations at block 0111, 0112, and 0113. That is, the determining module 13 is further configured to output the first image in the full-size mode, and/or output the second image in the first binning node, and/or output the third image in the second binning mode.

Referring again to FIG. 3, in some implementations, the processor 30 is further configured to perform operations at block 0111, 0112, and 0113. That is, the processor 30 is further configured to output the first image in the full-size mode, and/or output the second image in the first binning node, and/or output the third image in the second binning mode.

Specifically, when the image output mode is the full-size mode, the processor 30 controls the image sensor 21 to output the first image in the full-size mode. When the image output mode is the first binning mode, the processor 30 controls the image sensor 21 to output the second image in the first binning mode. When the image output mode is the second binning mode, the processor 30 controls the image sensor 21 to output the third image in the second binning mode.

The processor 30 may control the image sensor 21 to output the first image in the full-size mode and the second image in the first binning mode simultaneously. Optionally, the processor 30 may control the image sensor 21 to output the first image in the full-size mode and the third image in the second binning mode simultaneously. Optionally, the processor 30 may control the image sensor 21 to output the second image in the first binning mode and the third image in the second binning mode simultaneously. Optionally, the processor 30 may control the image sensor 21 to output the first image in the full-size mode, the second image in the first binning mode, and the third image in the second binning mode simultaneously.

After the image sensor 21 outputs the first and second images, or the second and third images, or the first and third images, or the first, second, and third images, the user may select a target image to save according to preference.

It can be understood that the image sensor 21 may simultaneously output multiple images as follows. The image sensor 21 rapidly outputs multiple images in different image output modes. Optionally, the image sensor 21 outputs a pixel value of each pixel (namely, outputting the first image in the full-size mode), and then the processor 30 performs combination processing according to each pixel value so as to respectively output the first image, second, and/or third images.

As such, the processor 30 may control image sensor 21 to output the corresponding image in the adapted image output mode.

Figure 13:
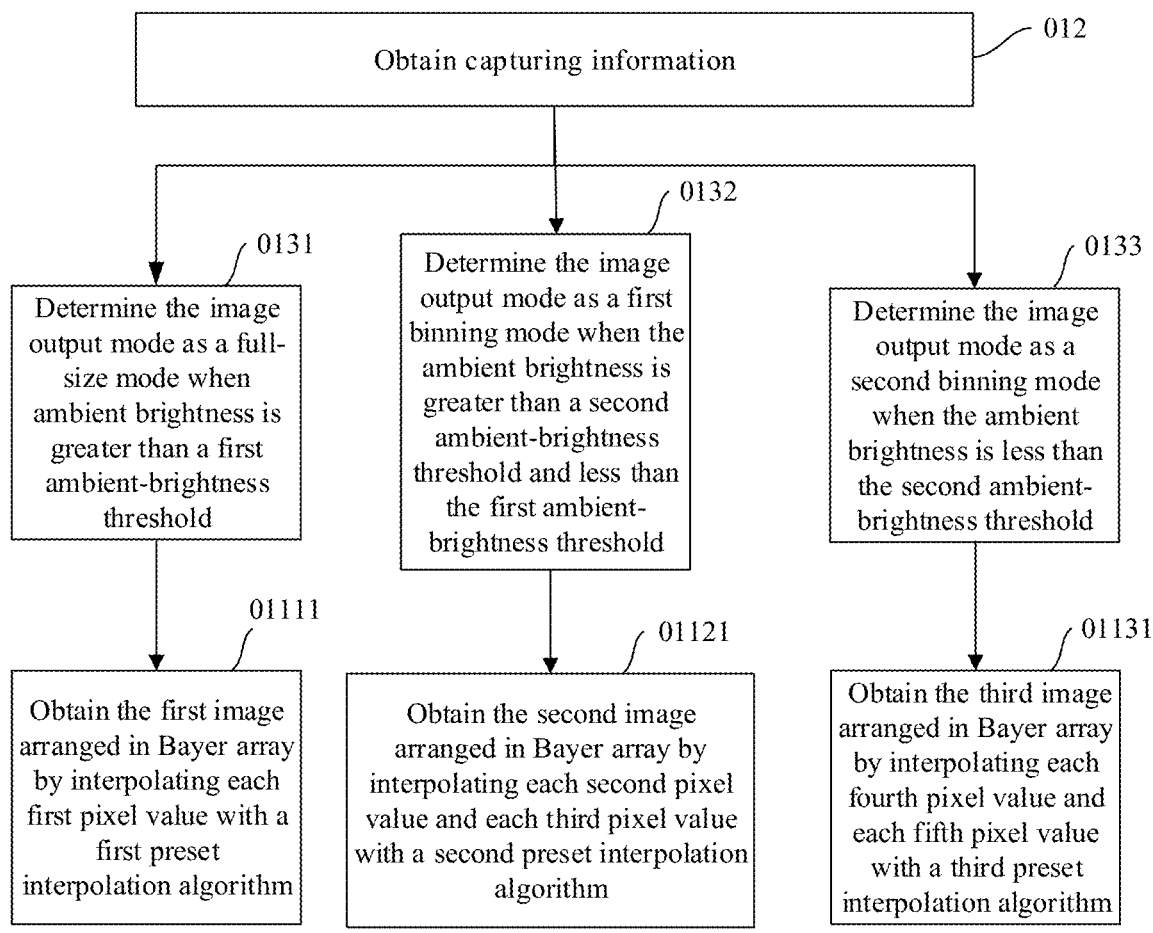
FIG. 13 is a schematic flowchart of an image obtaining method in some implementations of the disclosure.

Referring to FIG. 13, in some implementations, operations at block 0111 includes the following.

At block 01111, the first image arranged in Bayer array is obtained by interpolating each first pixel value with a first preset interpolation algorithm.

Referring again to FIG. 2, in some implementations, the determining module 13 is further configured to perform operations at block 01111. That is, the determining module 13 is further configured to obtain the first image arranged in Bayer array by interpolating each first pixel value with the first preset interpolation algorithm.

Referring again to FIG. 3, in some implementations, the processor 30 is further configured to perform operations at block 01111. That is, the processor 30 is further configured to obtain the first image arranged in Bayer array by interpolating each first pixel value with the first preset interpolation algorithm.

Figure 14:
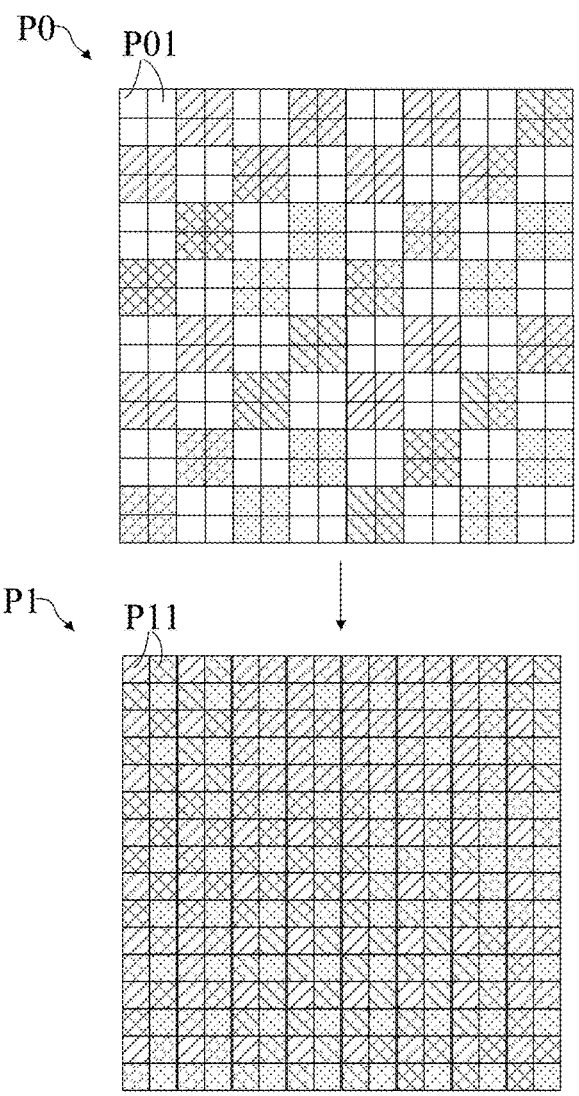
FIG. 14 is a schematic principle diagram of an image obtaining method in some implementations of the disclosure.

Referring to FIG. 14, specifically, when the image output mode is determined as the full-size mode, the image sensor 21 obtains the first pixel value of each pixel to generate an original image P0, where pixels P01 in the original image P0 are in one-to-one correspondence with the pixels 231 (illustrated in FIG. 8) in the pixel array 23. Then the processor 30 interpolates the first pixel value of each pixel P01 in the original image P0 with the first preset interpolation algorithm, so that each first pixel value in the original image P0 is interpolated as a pixel value of a corresponding target pixel P11 in the first image P1. Pixels P11 of the first image P1 are in one-to-one correspondence with pixels P01 of the original image P0, and a pixel corresponding to the position of the interpolated pixel in the first image P1 is a target pixel. As illustrated in FIG. 14, according to the color (color a being green, color b being red, and color c being blue) of each pixel in the first image P1 arranged in Bayer array to be generated, the first pixel value of the pixel P01 in the original image P0 is converted into a target pixel value of a color of the target pixel P11 in the first image P1. For example, the first target pixel P11 at the upper-left corner of the first image P1 (the target pixel of the pixel to be interpolated) is a red pixel, the processor 30 performs interpolation (for example, averaging) on the pixel to-be-interpolated, according to the first pixel value of the pixel to-be-interpolated in the original image P0 and a first pixel value of a red pixel P01 around the pixel to-be-interpolated. In this way, the first pixel value of the pixel to-be-interpolated is converted into the target pixel value of the target pixel P11. As such, each pixel P01 in the original image P0 may be converted through interpolation into the corresponding target pixel P11 in the first image P1, thus generating the first image P1 arranged in the Bayer array.

Referring to FIG. 13, in some implementations, operations at block 0112 includes the following.

At block 01121, the second image arranged in Bayer array is obtained by interpolating each second pixel value and each third pixel value with a second preset interpolation algorithm.

Referring again to FIG. 2, in some implementations, the determining module 13 is further configured to perform operations at block 01121. That is, the determining module 13 is further configured to obtain the second image arranged in Bayer array by interpolating each second pixel value and each third pixel value with the second preset interpolation algorithm.

Referring again to FIG. 3, in some implementations, the processor 30 is further configured to perform operations at block 01121. That is, the processor 30 is further configured to obtain the second image arranged in Bayer array by interpolating each second pixel value and each third pixel value with the second preset interpolation algorithm.

Figure 15:
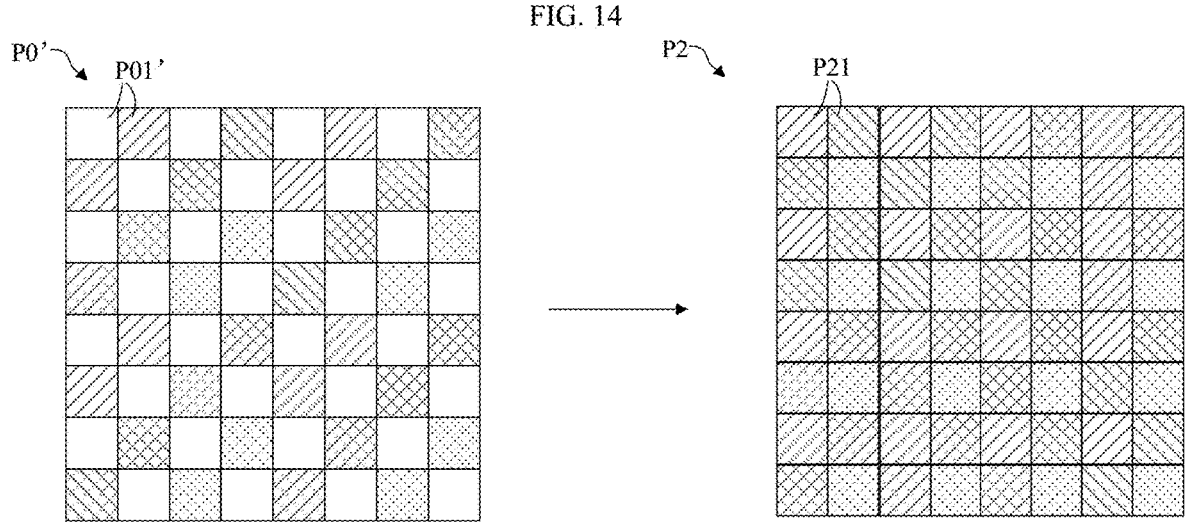
FIG. 15 is a schematic principle diagram of an image obtaining method in some implementations of the disclosure.
Figure 16:
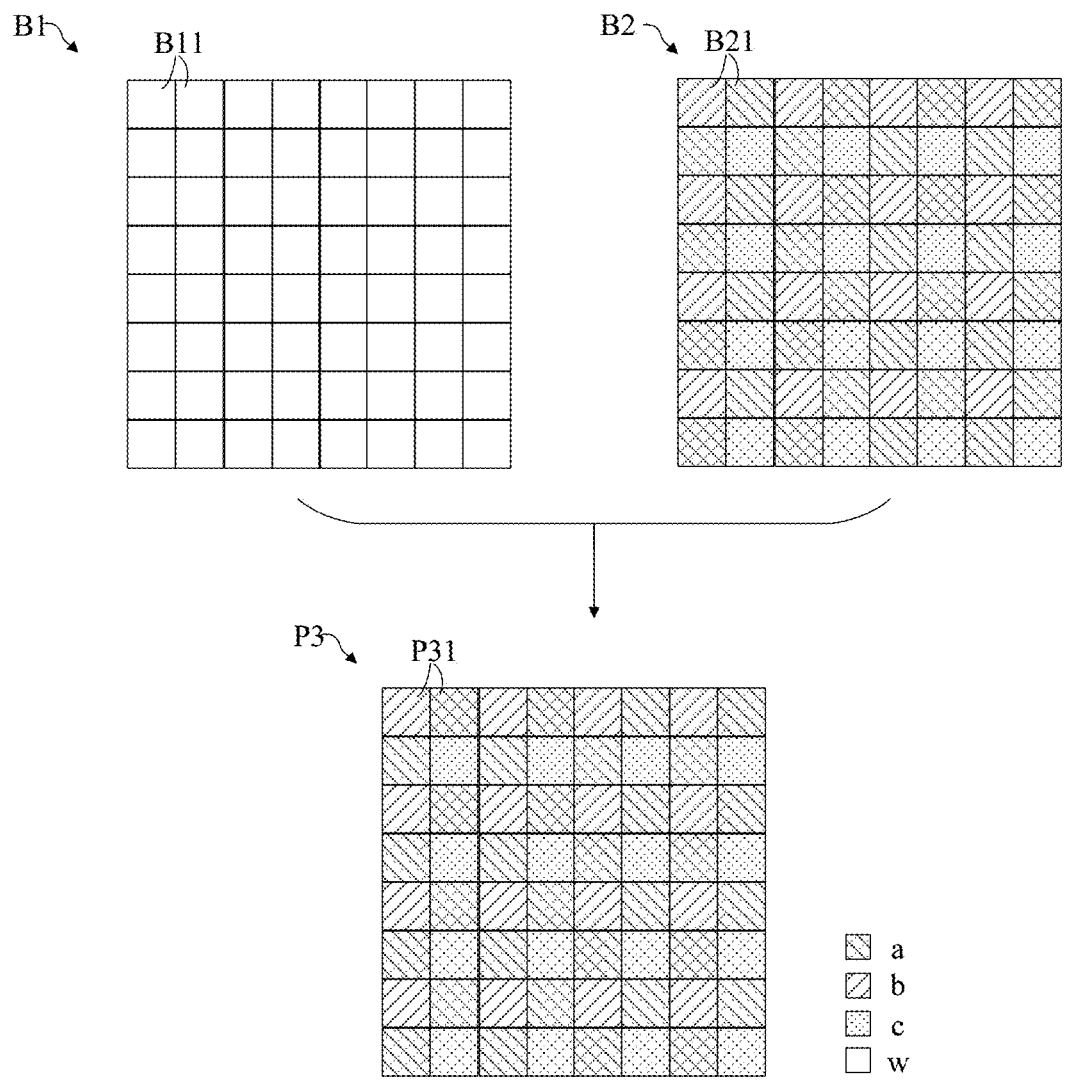
FIG. 16 is a schematic principle diagram of an image obtaining method in some implementations of the disclosure.

Referring to FIG. 15, specifically, when the image output mode is determined as the first binning mode, the image sensor 21 bins and reads out electrical signals of 4 panchromatic pixels 2351 in each panchromatic pixel unit 235 corresponding to the panchromatic filter 224, to obtain a second pixel value, and the image sensor 21 bins and reads out electrical signals of 4 color pixels 2341 in each color pixel unit corresponding to the color filter 223, to obtain a third pixel value. Then the image sensor 21 outputs an original image P0' according to the second pixel values and the third pixel values. In this case, the number of pixels in the original image P0' is ¼ of that in the original image P0. The processor 30 interpolates the second pixel values and the third pixel values in the original image P0' based on the second preset interpolation algorithm, so as to obtain a second image P2 arranged in Bayer array, where pixels P21 in the second image P2 are in one-to-one correspondence with pixels P01' in the original image P0', and a pixel in the second image P2 corresponding to the position of the interpolated pixel is a target pixel P21. The processor 30 may convert, according to the color (color a being green, color b being red, and color c being blue) of each pixel in the second image P2 to-be-generated in Bayer array, the second pixel value or the third pixel value of the pixel P01' in the original image P0' into a target pixel value of the color of the target pixel P21 in the second image P2. For example, the first pixel P21 at the upper-left corner of the second image P2 is a red pixel (the target pixel of the pixel to-be-interpolated), the processor 30 performs interpolation on the pixel to-be-interpolated, according to the second pixel value of a first pixel P01' (namely, the pixel to be interpolated) at the upper-left corner of the original image P0' and the third pixel value of a surrounding red pixel P01'. In this way, the second pixel value of the pixel to-be-interpolated is converted into the target pixel value of the target pixel P21. In this way, a pixel P01' in the original image P0' may be converted through interpolation into the corresponding target pixel P21 in the second image P2, thus generating the second image P2 in Bayer array.

Referring to FIG. 13, in some implementations, operations at block 0113 includes the following.

At block 01131, the third image arranged in Bayer array is obtained by interpolating each fourth pixel value and each fifth pixel value with a third preset interpolation algorithm.

Referring again to FIG. 2, in some implementations, the determining module 13 is further configured to perform operations at block 01131. That is, the determining module 13 is further configured to obtain the third image arranged in Bayer array by interpolating each fourth pixel value and each fifth pixel value with the third preset interpolation algorithm.

Referring again to FIG. 3, in some implementations, the processor 30 is further configured to perform operations at block 01131. That is, the processor 30 is further configured to obtain the third image arranged in Bayer array by interpolating each fourth pixel value and each fifth pixel value with the third preset interpolation algorithm.

Specifically, when the image output mode is determined as the second binning mode, the image sensor 21 bins and reads out electrical signals of 8 panchromatic pixels 2351 in the panchromatic pixel units 235 corresponding to all panchromatic filters 224 in each filter group 222 to obtain the fourth pixel value, and bins and reads electrical signals of 8 color pixels 2341 in the color pixel units 234 corresponding to all color filters 223 in each filter group 222, to obtain the fifth pixel value. Then the image sensor 21 outputs a first intermediate image B1 according to the fourth pixel values and a second intermediate image B2 according to the fifth pixel values. The processor 30 interpolates the first intermediate image B1 and the second intermediate image B2 based on the third preset interpolation algorithm to obtain the third image P3 arranged in Bayer array. For example, the pixel values of the pixels at corresponding positions in the first intermediate image B1 and the second intermediate image B2 can be weighted and summed (for example, the weights are both 0.5) to serve as a target pixel value of the target pixel P31 corresponding to the position in the third image P3. For example, the fourth pixel value f1 of the first pixel B11 in the upper-left corner of the first intermediate image B1 and the fifth pixel value f2 of the first pixel B21 in the upper-left corner of the second intermediate image B2 are weighted and summed to obtain the target pixel value of the first pixel P31 in the upper-left corner of the third image P3, which is 0.5×f1+0.5×f2. As such, the third image P3 arranged in Bayer array can be obtained according to the interpolation of the first intermediate image B1 and the second intermediate image B2.

It can be understood that in the above implementations, pixels at corresponding positions in different images refer to pixels with the same coordinates in different images, where the first pixel in the upper-left corner of the image is taken as the coordinate origin.

Figure 17:
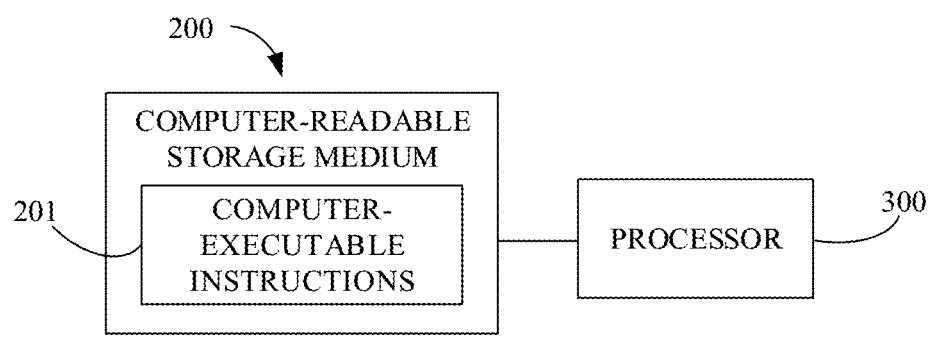
FIG. 17 is a schematic diagram illustrating connection between a readable storage medium and a processor in some implementations of the disclosure.

In combination with FIG. 1 and the FIG. 17, implementations of the disclosure further provide a non-transitory computer-readable storage medium 200. The one or more non-transitory computer-readable storage media 200 include a computer program 201 which, when executed by one or more processor 300, causes the processor 300 to perform the following operations.

At block 011, an image is output in at least one of the image output modes.

In combination with FIG. 10, further, when the computer program 201 is executed by one or more processor 300, the processor 300 may further perform the following operations.

At block 0131, the image output mode is determined as a full-size mode when ambient brightness is greater than a first ambient-brightness threshold.

At block 0132, the image output mode is determined as a first binning mode when the ambient brightness is greater than a second ambient-brightness threshold and less than the first ambient-brightness threshold.

At block 0133, the image output mode is determined as a second binning mode when the ambient brightness is less than the second ambient-brightness threshold. The first ambient-brightness threshold is less than the second ambient-brightness threshold.

Figure 18:
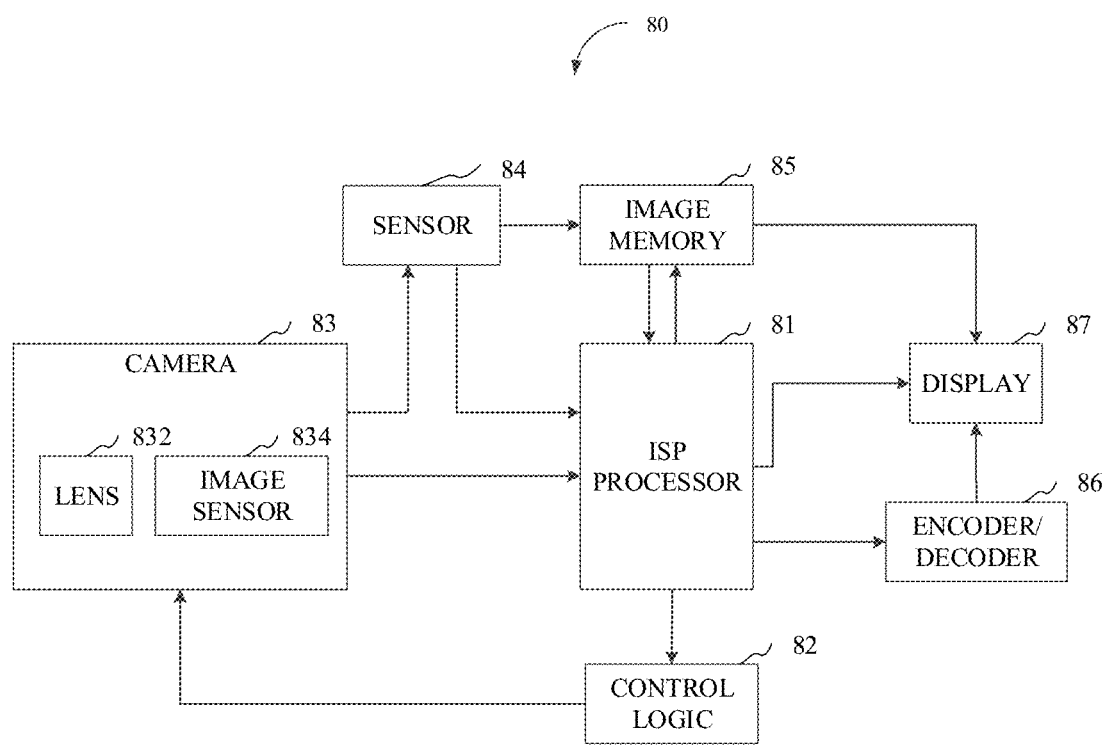
FIG. 18 is a schematic block diagram of an image processing circuit in some implementations of the disclosure.

Referring to FIG. 18, the processor 30 in implementations of the present disclosure may be an image processing circuit 80. The image processing circuit 80 may be implemented by hardware and/or software components, including various processing units defining an image signal processing (ISP) pipeline. FIG. 18 is a schematic diagram of an image processing circuit 800 in one embodiment. As illustrated in FIG. 18, for ease of description, only various aspects of the image processing technology related to the implementations of the present disclosure are illustrated.

As illustrated in FIG. 18, the image processing circuit 80 includes an ISP processor 81 and a control logic 82. The image data captured by camera 83 is first processed by the ISP processor 81. The ISP processor analyzes the image data to capture image statistics that can be used to determine one or more control parameters of the camera 83. The camera 83 (which may be the camera 20 of the terminal 100 illustrated in FIG. 3) may include one or more lenses 832 and an image sensor 834 (the image sensor 834 may be the image sensor 21 of the camera 20 illustrated in FIG. 3). The image sensor 834 may include a color filter array (the color filter array may be the filter array 22 illustrated in FIG. 6). The image sensor 834 may obtain the light intensity and wavelength information captured by each imaging pixel, and provide a set of original image data that can be processed by the ISP processor 81. A sensor 84 (such as gyroscope) may provide captured image-processing parameters (such as anti-shaking parameters) to the ISP processor 81 based on an interface type of the sensor 84. The sensor 84 interface may be a standard mobile imaging architecture (SMIA) interface, other serial or parallel camera interfaces, or a combination of the above interfaces.

In addition, the image sensor 834 may also send the original image data to the sensor 84, and the sensor 84 may provide the original image data to the ISP processor 81 based on the interface type of the sensor 84, or the sensor 84 may store the original image data in an image memory 85.

The ISP processor 81 processes the original image data pixel by pixel in a variety of formats. For example, each image pixel may have a bit depth of 8, 10, 12 or 14 bits. The ISP processor 81 may perform one or more image processing operations on the original image data and collect statistical information about the image data. The image processing operation may be performed with the same or different bit depth precision.

The ISP processor 81 may also receive image data from the image memory 85. For example, the original image data is sent to the image memory 85 through the sensor 84 interface, and the original image data in the image memory 85 is then provided to the ISP processor 81 for processing. The image memory 85 may be a memory 53, a part of the memory 53, a storage device, or an independent special memory in an electronic device, and may include a direct memory access (DMA) feature.

When receiving the original image data from the image sensor 834 interface or from the sensor 84 interface or from the image memory 85, the ISP processor 81 may perform one or more image processing operations, such as interpolation, median filtering, bilateral smoothing filtering, etc. The processed image data may be sent to the image memory 85 for further processing before being displayed. The ISP processor 81 receives the processed data from the image memory 85 and processes the processed data in the original domain and RGB and YCbCr color space. The image data processed by the ISP processor 81 may be output to the display 87 (the display 87 can be the display 60 of the terminal 100 as illustrated in FIG. 3) for users to view and/or be further processed by the graphics engine or graphics processing unit (GPU). In addition, the output of the ISP processor 81 may also be sent to the image memory 85, and the display 87 may read the image data from the image memory 85. In one implementation, the image memory 85 may be configured to implement one or more frame buffers. In addition, the output of the ISP processor 81 may be sent to the encoder/decoder 86 for encoding/decoding image data. The encoded image data may be saved and decompressed before being displayed on the display 87. The encoder/decoder 86 may be implemented by CPU or GPU or coprocessor.

The statistical data determined by the ISP processor 81 may be sent to the control logic 82. For example, the statistical data may include image output mode, automatic exposure, automatic white balance, automatic focus, flicker detection, black level compensation, lens shadow correction and other image-sensor statistical information. The control logic 82 may include a processing element and/or a microcontroller that executes one or more routines (such as firmware), and one or more routines may determine the control parameters of the camera 83 and the control parameters of the ISP processor 81 based on the received statistical data. For example, the control parameters of camera 83 may include sensor 84 control parameters (such as gain, integral time of exposure control, anti-shake parameters, etc.), camera flash control parameters, lens control parameters (such as focal length for focus or zoom), or a combination of these parameters. ISP control parameters may include gain level and color correction matrix for automatic white balance and color adjustment (for example, during RGB processing), and lens shadow correction parameters.

In combination with FIG. 1, the image obtaining method are achieved by the image processing circuit 80 (specifically, the ISP processor 81) as follows.

At block 011, an image is output in at least one of multiple image output modes.

In combination with FIG. 10, further, the image processing circuit 80 (specifically, the ISP processor 81) may further execute the following.

At block 0131, the image output mode is determined as a full-size mode when ambient brightness is greater than a first ambient-brightness threshold At block 0132, the image output mode is determined as a first binning mode when the ambient brightness is greater than a second ambient-brightness threshold and less than the first ambient-brightness threshold.

At block 0133, the image output mode is determined as a second binning mode when the ambient brightness is less than the second ambient-brightness threshold. The first ambient-brightness threshold is less than the second ambient-brightness threshold.

Those of ordinary skill in the art can understand that all or part of the process in the methods of the above-mentioned implementations can be realized through computer programs to instruct relevant hardware to complete, and the programs can be stored in a non-volatile computer-readable storage medium which, when executed, may include the processes of the implementations of the above-mentioned methods. The storage medium may be a magnetic disk, an optical disk, a read-only memory (ROM), and the like.

Above implementations are only several implementation modes of the present disclosure, and the description thereof is comparatively specific and detailed, but cannot be interpreted as the limitation to the patent scope of the present application. It should be noted that those skilled in the art can make several modifications and improvements without departing from the concept of the present disclosure, and these all within the protection scope of the present disclosure. Therefore, the scope of protection of the patent disclosure should be based on the appended claims.

What is claimed is:

1. An image obtaining method, applied to an image sensor, the image sensor comprising a filter array and a pixel array, the filter array comprising minimal repeating units, each minimal repeating unit comprising a plurality of filter groups, each filter group comprising a color filter and a panchromatic filter, a waveband of light passing through the color filter being narrower than a waveband of light passing through the panchromatic filter, the color filter and the panchromatic filter each comprising a plurality of sub-filters, the pixel array comprising a plurality of pixels, each pixel corresponding to one sub-filter in the filter array and being configured to receive light passing through the sub-filter to generate an electrical signal, the method comprising:
outputting an image in at least one of a plurality of image output modes, wherein the plurality of image output modes comprising:
a full-size mode in which a first image is obtained according a first pixel value read from each pixel;
a first binning mode in which a second image is obtained according to a second pixel value and a third pixel value, wherein the second pixel value is read from binning of a plurality of pixels corresponding to the panchromatic filter, and the third pixel value is read from binning of a plurality of pixels corresponding to the color filter; and
a second binning mode in which a third image is obtained according to a fourth pixel value and a fifth pixel value, wherein the fourth pixel value is read from binning of a plurality of pixels corresponding to all panchromatic filters in the filter group, and the fifth pixel value is read from binning of a plurality of pixels corresponding to all color filters in the filter group.

2. The method of claim 1, further comprising:
obtaining capturing information, the capturing information comprising at least one of ambient brightness or a capturing parameter; and
determining the image output mode adapted to the capturing information.

3. The method of claim 2, wherein the capturing parameter comprises an exposure parameter, and obtaining the capturing information comprises:
determining the ambient brightness according to an ambient-light intensity signal obtained by an optical sensor; or
determining the ambient brightness according to the exposure parameter.

4. The method of claim 2, wherein determining the image output mode adapted to the capturing information comprising:
determining the image output mode adapted to at least one of the ambient brightness or the capturing parameter.

5. The method of claim 4, wherein determining the image output mode adapted to the ambient brightness comprising:
determining the image output mode as the full-size mode in response to the ambient brightness being greater than a first ambient-brightness threshold;
determining the image output mode as the first binning mode in response to the ambient brightness being greater than a second ambient-brightness threshold and less than the first ambient-brightness threshold; and
determining the image output mode as the second binning mode in response to the ambient brightness being less than the second ambient-brightness threshold.

6. The method of claim 4, wherein the capturing parameter comprises an exposure parameter, and determining the image output mode adapted to the ambient brightness and the capturing parameter comprises:
determining an amount of admitted light according to the ambient brightness and the exposure parameter;
determining the image output mode as the full-size mode in response to the amount of admitted light being greater than a first amount threshold;
determining the image output mode as the first binning mode in response to the amount of admitted light being greater than a second amount threshold and less than the first amount threshold; and
determining the image output mode as the second binning mode in response to the amount of admitted light being less than the second amount threshold.

7. The method of claim 1, wherein outputting the image in at least one of the plurality of image output modes comprises one or more of the following:
outputting the first image in the full-size mode;
outputting the second image in the first binning mode; and
outputting the third image in the second binning mode.

8. The method of claim 7, wherein outputting the first image in the full-size mode comprises:
obtaining the first image arranged in Bayer array by interpolating each first pixel value with a first preset interpolation algorithm.

9. The method of claim 7, wherein outputting the second image in the first binning mode comprises:
obtaining the second image arranged in Bayer array by interpolating each second pixel value and each third pixel value with a second preset interpolation algorithm.

10. The method of claim 7, wherein outputting the third image in the second binning mode comprises:
obtaining the third image arranged in Bayer array by interpolating each fourth pixel value and each fifth pixel value with a third preset interpolation algorithm.

11. The method of claim 1, wherein the plurality of filter groups are 4 filter groups arranged in a matrix, and the color filter and the panchromatic filter each comprise 4 sub-filters.

12. The method of claim 1, wherein the filter group comprises 2 color filters and 2 panchromatic filters, the 2 color filters and the 2 panchromatic filters are arranged in a matrix, the 2 color filters are arranged in a first diagonal direction, and the 2 panchromatic filters are arranged in a second diagonal direction different from the first diagonal direction.

13. The method of claim 12, wherein the minimal repeating unit comprises 64 sub-filters arranged in 8 rows and 8 columns as follows:
w w b b w w a a
w w b b w w a a
b b w w a a w w
b b w w a a w w
w w a a w w c c
w w a a w w c c
a a w w c c w w
a a w w c c w w
wherein w represents a panchromatic sub-filter, and a, b, and c each represent a color sub-filter.

14. The method of claim 12, wherein the minimal repeating unit comprises 64 sub-filters arranged in 8 rows and 8 columns as follows:
b b w w a a w w
b b w w a a w w
w w b b w w a a
w w b b w w a a
a a w w c c w w
a a w w c c w w
w w a a w w c c
w w a a w w c c
wherein w represents a panchromatic sub-filter, and a, b, and c each represent a color sub-filter.

15. The method of claim 1, wherein in each filter group, the panchromatic filters are arranged in a third diagonal direction and a fourth diagonal direction, and the color filters are arranged in the third diagonal direction or the fourth diagonal direction, wherein the third diagonal direction is different from the fourth diagonal direction.

16. The method of claim 15, wherein the minimal repeating unit comprises 144 sub-filters arranged in 12 rows and 12 columns as follows:
w w b b w w w w a a w w
w w b b w w w w a a w w
b b w w b b a a w w a a
b b w w b b a a w w a a
w w b b w w w w a a w w
w w b b w w w w a a w w
w w a a w w w w c c w w
w w a a w w w w c c w w
a a w w a a c c w w c c
a a w w a a c c w w c c
w w a a w w w w c c w w
w w a a w w w w c c w w
wherein w represents a panchromatic sub-filter, and a, b, and c each represent a color sub-filter.

17. The method of claim 1, wherein in each filter group, the color filters are arranged in a fifth diagonal direction and a sixth diagonal direction, and the panchromatic filters are arranged in the fifth diagonal direction or the sixth diagonal direction, wherein the fifth diagonal direction is different from the sixth diagonal direction.

18. The method of claim 17, wherein the minimal repeating unit comprises 144 sub-filters arranged in 12 rows and 12 columns as follows:
b b w w b b a a w w a a
b b w w b b a a w w a a
w w b b w w w w a a w w
w w b b w w w w a a w w
b b w w b b a a w w a a
b b w w b b a a w w a a
a a w w a a c c w w c c
a a w w a a c c w w c c
w w a a w w w w c c w w
w w a a w w w w c c w w
a a w w a a c c w w c c
a a w w a a c c w w c c
wherein w represents a panchromatic sub-filter, and a, b, and c each represent a color sub-filter.

19. A terminal, comprising:
an image sensor and a processor, the image sensor comprising a filter array, a pixel array, and a readout circuit, the filter array comprising minimal repeating units, each minimal repeating unit comprising a plurality of filter groups, each filter group comprising a color filter and a panchromatic filter, a waveband of light passing through the color filter being narrower than a waveband of light passing through the panchromatic filter, the color filter and the panchromatic filter each comprising a plurality of sub-filters, the pixel array comprising a plurality of pixels, each pixel corresponding to one sub-filter in the filter array and being configured to receive light passing through the sub-filter to generate an electrical signal, the processor being configured to:

obtain capturing information, the capturing information comprising at least one of ambient brightness and a capturing parameter;

determine an image output mode adapted to the capturing information, the image output mode comprising:
- a full-size mode in which a first image is obtained according a first pixel value read from each pixel;
- a first binning mode in which a second image is obtained according to a second pixel value and a third pixel value, wherein the second pixel value is read from binning of a plurality of pixels corresponding to the panchromatic filter, and the third pixel value is read from binning of a plurality of pixels corresponding to the color filter; and
- a second binning mode in which a third image is obtained according to a fourth pixel value and a fifth pixel value, wherein the fourth pixel value is read from binning of a plurality of pixels corresponding to all panchromatic filters in the filter array, and the fifth pixel value is read from binning of a plurality of pixels corresponding to all color filters in the filter array; and control the readout circuit to output an image according to the adapted image output mode.

20. A non-transitory computer-readable storage medium comprising a computer program which, when executed by one or more processors, causes the one or more processors to:

output an image in at least one of a plurality of image output modes, the image output mode comprising:
- a full-size mode in which a first image is obtained according a first pixel value read from each pixel in a pixel array of an image sensor, wherein the image sensor comprises a filter array and the pixel array, the filter array comprises minimal repeating units, each minimal repeating unit comprises a plurality of filter groups, each filter group comprises a color filter and a panchromatic filter, a waveband of light passing through the color filter is narrower than a waveband of light passing through the panchromatic filter, the color filter and the panchromatic filter each comprise a plurality of sub-filters, the pixel array comprises a plurality of pixels, each pixel corresponds to one sub-filter in the filter array and is configured to receive light passing through the sub-filter to generate an electrical signal;
- a first binning mode in which a second image is obtained according to a second pixel value and a third pixel value, wherein the second pixel value is read from binning of a plurality of pixels corresponding to the panchromatic filter, and the third pixel value is read from binning of a plurality of pixels corresponding to the color filter; and
- a second binning mode in which a third image is obtained according to a fourth pixel value and a fifth pixel value, wherein the fourth pixel value is read from binning of a plurality of pixels corresponding to all panchromatic filters in the filter array, and the fifth pixel value is read from binning of a plurality of pixels corresponding to all color filters in the filter array.

* * * * *